Feb. 8, 1949.    E. A. GUILLEMIN    2,461,321
PRODUCTION OF ELECTRIC PULSES
Filed June 24, 1943    4 Sheets-Sheet 1
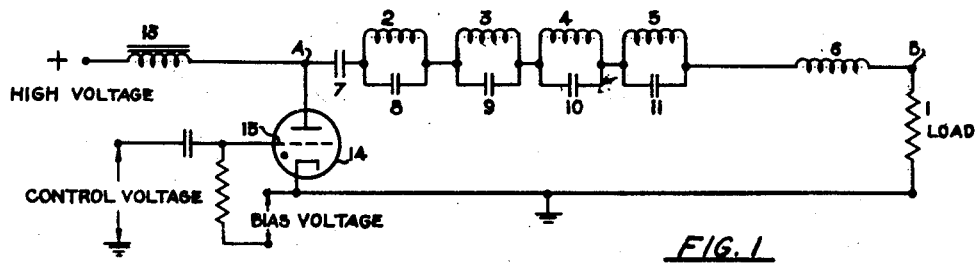
FIG. 1
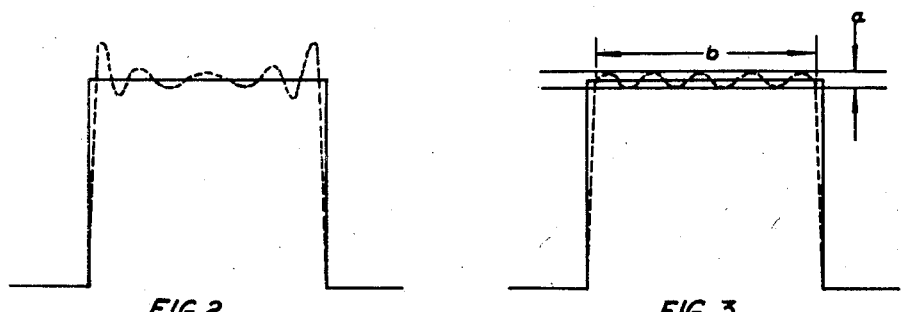
FIG. 2    FIG. 3
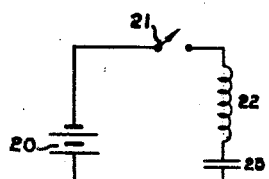    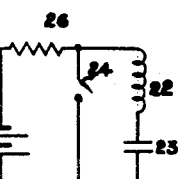    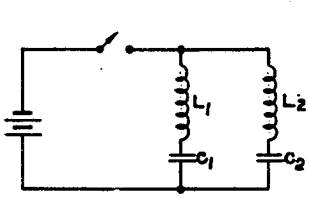
FIG. 4    FIG. 4A    FIG. 5

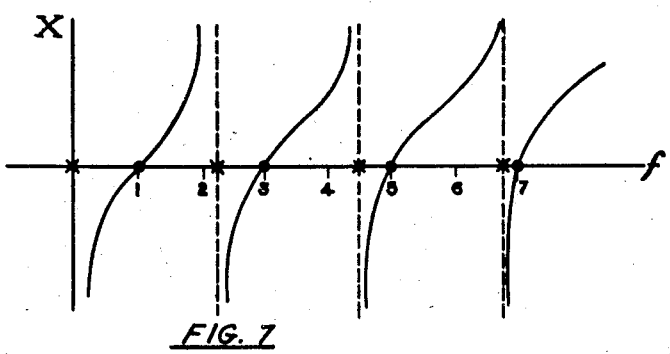
FIG. 7
INVENTOR
Ernst A. Guillemin
BY *Stone & Bush*
ATTORNEY

Feb. 8, 1949. E. A. GUILLEMIN 2,461,321
PRODUCTION OF ELECTRIC PULSES
Filed June 24, 1943 4 Sheets-Sheet 2

INVENTOR
Ernst A. Guillemin

BY *Stone E Bush*
ATTORNEY

Feb. 8, 1949. E. A. GUILLEMIN 2,461,321
PRODUCTION OF ELECTRIC PULSES
Filed June 24, 1943 4 Sheets-Sheet 3

INVENTOR
Ernst A. Guillemin
BY
ATTORNEY

Feb. 8, 1949.  E. A. GUILLEMIN  2,461,321
PRODUCTION OF ELECTRIC PULSES
Filed June 24, 1943  4 Sheets-Sheet 4

INVENTOR
Ernst A. Guillemin
BY
ATTORNEY

Patented Feb. 8, 1949

2,461,321

UNITED STATES PATENT OFFICE 2,461,321

PRODUCTION OF ELECTRIC PULSES

Ernst A. Guillemin, Wellesley, Mass., assignor, by mesne assignments, to the United States of America as represented by the Secretary of the Navy Application June 24, 1943, Serial No. 492,160

21 Claims. (Cl. 171—97)

This invention relates to arrangements for the production of electric pulses of a desired form in a load of a given type and more particularly to circuits comprising reactive components of convenient physical dimensions adapted to produce pulses of a desired form, amplitude and duration in a load of a given impedance after the occurrence of a suitable sudden change of state such as may be produced by a simple switching operation.

Some attempts have been made in the past to produce such pulses by a switching operation in a circuit containing a reactive network and a load, but because these attempts involved consideration more related to steady-state analysis than to the analysis of transient response, the results of such attempts generally produced deviations from the desired pulse shape in the form of ripples which were often beyond the desired tolerance when a reasonable number of reactive components were employed. I have found that by synthesizing a reactive network with regard to the transient response of such network, a solution may be obtained which approximates the desired form of pulse within a much smaller tolerance for a given number of reactive components than has been effected with arrangements heretofore devised.

The invention is best explained with reference to the drawings in which:

Fig. 1 is a circuit diagram of an apparatus for generating electric pulses in a load as a result of a simple switching operation;

Figs. 2 and 3 are diagrams showing different ways in which a pulse of square form may be approximated;

Figs. 4, 4A and 5 are circuit diagrams for the illustration of certain principles upon which the invention depends;

Fig. 7 is a theoretical diagram illustrating the reactance corresponding to a network such as that of Fig. 6 when the components are designed in accordance with the present invention;

Figure 6:
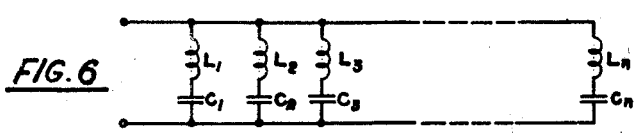
Fig. 6 is a schematic diagram of one form of reactive network in accordance with the present invention.

It is often desirable to provide, in an electric circuit, electric pulses in which the voltage and current suddenly rise from a fixed value such as zero to another fixed value, then remain at the latter value for a given period of time, usually a short period, and then suddenly fall again to the original value. Such a pulse may be described as a "rectangular" pulse because of the shape of the corresponding plot of voltage or current against time. Such pulses are particularly useful for the modulation or "keying" of high-frequency radio for intermittent short-period high-intensity operation. If the part of the circuit in which it is desired to produce the electric pulse, which part of the circuit may be regarded as the load, is a pure resistance or reasonably similar to a pure resistance, both the voltage and current waves have the same form. In practice, although the load provided by a transmitter designed to operate on intermittent high-intensity pulses usually differs appreciably from a pure linear resistance, satisfactory results in pulse-forming apparatus may be obtained by designing the apparatus as if the load were a pure resistance of generally equivalent value.

Fig. 1 illustrates an arrangement of apparatus for producing rectangular electric pulses in a load 1, which is shown at the right as a resistance, it being understood that this representation of the load is quite general and that an electrical circuit which it is desired to operate by the pulses formed, such as the plate circuit of a radio transmitter, might be connected in the circuit in the place of the load. The part of the circuit shown in Fig. 1 between the points A and B constitutes a two-terminal reactant network the design of which is more fully described below. This network is made up of the coils 2, 3, 4, 5, and 6 and the condensers 7, 8, 9, 10, and 11. The network is connected to a high-voltage source through the choke coil 13. The other end of the network is connected to ground through the load. The high-voltage side of the network is connected to the anode of a gas discharge device 14, the cathode of which is connected to ground. The gas discharge device 14 acts as an electronic switch and has a control electrode 15 which is adapted to be connected to bias and control voltages in the usual manner. When the gas discharge tube 14 is non-conducting, the condenser 7 of the network will be charged by the aforesaid high voltage. The choke 13 is preferably made of such size that it resonates with the condenser 7 at the frequency at which the network is charged and discharged. The inductances 2, 3, 4, 5 and 6 may be left out of account because they are small compared to the inductance of the choke coil 13. The proper choice of the magnitude of the choke 13 enables the condenser 7 to be charged to a higher voltage for a given supply voltage. When, by a suitable change of control voltage, the discharge device 14 is suddenly made conducting, the electrical energy stored in the network will discharge through the load 1 and the discharge device 14. The network design will determine the duration and form of the discharge. If the network were a parallel-conductor transmission line of suitable characteristic impedance and of a length $x$, open at one end and connected at the other end to the points A and B, and if the said transmission line had negligible dissipation, the discharge would be in the form of a rectangular pulse of a voltage equal to half that to which the line was charged and of a duration equal to $$\frac{2x}{c}$$

where $c$ is equal to the velocity of light. For a one microsecond pulse, such a transmission line would have to be 150 meters long, an inconveniently large structure. Instead of the transmission line, which is a circuit having distributed reactances, networks of lumped reactances may be provided which when inserted between the points A and B of Fig. 1 and excited and triggered as aforesaid, will produce a pulse which approximates the desired rectangular pulse. The network shown in Fig. 1 between the points A and B is a general representation of such a network and may, for instance, be a network designed in accordance with this present invention as explained below. Networks have been known which from the point of view of steady-state analysis and behavior closely approximate the properties of a transmission line for a given range of frequencies. In general, such networks, which are often called "artificial lines," when used to approximate the square pulse response, result in an approximation of the Fourier type, such as is shown diagrammatically in Fig. 2. It is an object of this invention to avoid this type of approximation because of certain inherent disadvantages thereof presently to be discussed and to proceed instead upon a new approach in which the transient response of the component is the chief consideration.

In the Fourier analysis of a single rectangular pulse, certain well-known expressions result which give a series of terms representing components of such a pulse having different frequencies and amplitudes, the frequencies and amplitudes being given by these various expressions. At frequencies higher than a certain frequency which is related to the pulse duration, the amplitudes of the higher-frequency components are generally smaller than the amplitude of the lower-frequency components, (for although the curve determining these amplitudes oscillates, the maxima of such oscillation decreases with frequency). Thus if a given network is progressively modified to approximate the characteristics of a transmission line over an increasing range of frequencies from zero up to some limit frequency, the deviation from the rectangular pulse form, when the network is connected as in Fig. 1 will be progressively smaller as the frequency of the lowest-frequency component outside the range of approximation becomes higher.

The excitation of the network being essentially a "step wave" (a D. C. switching effect), which may be regarded as containing all frequencies up to a high limit determined by the steepness of the "step," the network needed to form a rectangular pulse response should be able to respond at suitable relative amplitudes to the frequencies needed to form the pulse of the desired length, and should preferably not respond at other frequencies.

A network of a finite number of lumped reactances has a finite number of resonance frequencies, as distinguished from a distributed reactance circuit such as a transmission line which has an infinite number thereof. The network approximation of a transmission line must, therefore, neglect some of the frequency components of the functions in question and in general it is preferable to neglect the higher-frequency components because of their small amplitudes. The type of approximation of a square pulse obtainable by combining the lower-frequency components at the amplitudes prescribed by the coefficients of a Fourier series and by neglecting the nature of the response at higher frequencies is shown in a general manner in Fig. 2. The solid line represents the desired square pulse and the dotted line represents the actual type of pulse resulting where the pulse-forming network fails to respond to the higher-frequency components of the exciting step wave. The ripples in the top of the pulse as shown in Fig. 2 are symmetrical about the center, since it is assumed that the network has negligible dissipation. In actual apparatus the initial overshoot and the ripples in the initial part of the pulse will be more prominent than the succeeding ripples, and in addition the amplitude of the pulse may decrease with time because of the existence of losses in the network. For purposes of illustration of the principles of the present invention, however, it is more convenient to consider the phenomena occurring in the absence of dissipation, since the presence of dissipation merely involves a fairly simple modification of the representation of said phenomena, as is well understood.

As an increasing number of the resonance frequencies of the previously considered transmission line are represented in the network, beginning with the lower frequencies and progressing toward the higher frequencies, the number of ripples in the response pulse, shown by the dotted line in Fig. 2, increases and the amplitude of the ripples decreases except that the initial "overshoot" is not much decreased in amplitude, although it is reduced in duration. When the response approaches the desired square pulse, especially in the manner in which a Fourier series approaches a square function with the addition of successive terms, the maxima nearest the corners of the pulse are relatively high and in general the ripples are larger and sharper towards the edges of the pulse and lower and smoother in the center of the pulse. A higher degree of approximation following this approach will reduce the magnitude of the ripples but will not affect this peculiar distribution of ripple amplitudes.

For practical purposes the merit of an approximation of a square pulse may be referred to the maximum deviation from the desired shape rather than on the integrated deviation over the whole period of the pulse. Thus, in simple terms, the type of approximation shown in Fig. 2 is undesirable because of the relatively large deviation from the desired pulse forms near the corners of the pulse, irrespective of the high degree of approximation towards the center of the pulse which does not, for practical purposes, compensate for the aforesaid high deviation at the corners. Some approach is, therefore, desirable which does not proceed by simply simulating the reactance of a line at higher and higher frequencies by increasing the number of components while keeping the network in the form of a series of identical sections.

In accordance with the present invention one proceeds to determine the constitution of a network which when excited by a step wave, as, for instance, in the circuit of Fig. 1, will produce a response which is an approximation of a rectangular wave in which the various points of maximum deviation from the desired pulse form are substantially equal so that the maximum deviation or "tolerance" may be quite small although no great precaution is taken to reduce the integrated deviation over the period of the pulse. I have found that when a network is constructed on this approach on the basis of the analysis of transient response, a great improvement in the reduction of the tolerance may be achieved for a given number of reactive components in the network as compared with the network which approaches the desired response after the manner of a Fourier series as hereinbefore outlined.

The type of response which is designed to exhibit a minimum tolerance for a given number of components is shown in Fig. 3, the dotted line representing the response in question and the solid line representing the rectangular pulse which it is desired to approximate. The total amplitude of the ripple, which is twice the tolerance, is shown by the dimension $a$. The period within which the tolerance in question is maintained is shown by the dimension $b$, which is sometimes referred to as the "coverage." The approach to a rectangular pulse by a wave of this form with an increasing number of network components is more rapid than an approach by a wave of the form of Fig. 2 because the addition of components in the case of Fig. 2 goes partly to reduce the amplitude of the already small ripples in the center, whereas if each time components are added the network is redesigned to maintain the type of approximation shown in Fig. 3, maximum tolerance-reducing advantage is taken of the new component.

In order to explain the construction of networks in accordance with the present invention to produce rectangular pulse approximations of the forms shown in Fig. 3, is will be convenient to refer first to transient phenomena and simple networks. It is to be understood that the diagrams of Fig. 2 and Fig. 3 are illustrative rather than mathematically accurate, the ripples being somewhat magnified in order that their character may be readily apparent.

In Fig. 4 is shown a simple circuit in which are connected in series a battery 20 of a given voltage E, a switch 21, an inductance 22 and a capacitance 23. It is assumed that there is no dissipation in the circuit. If the circuit is suddenly closed by means of the switch 21 (assuming the condenser 23 to have been in a discharged condition before the circuit was closed) the current flowing in the circuit will be given by the expression, $$i(t) = E\frac{C}{L} \sin \frac{t}{LC}$$

In the above expression the sine factor indicates a frequency and the $$E\frac{C}{L}$$

factor gives its amplitude. Thus, if the losses in the circuit are zero, a sine wave will be produced the amplitude of which remains constant.

Fig. 4A shows a circuit similar to Fig. 4 with the modification that the circuit is arranged to produce a sinusoidal oscillation upon the discharge of the reactive network instead of upon the charging of the network. Instead of the switch 21 provided in Fig. 4 for the application of voltage to the network, the switch 24 is provided in Fig. 4A for suddenly short-circuiting the terminals of the network and causing it to discharge. In order to protect the voltage source 25 against damage resulting from being short-circuited, a high resistance 26 is provided in series with the source 25. When the switch 24 is suddenly closed a current will flow which is given by the above equation and if there are no losses in the circuit the oscillations will continue undamped.

Now if instead of the coil and condenser either in Fig. 4 or in Fig. 4A a lossless transmission line open-circuited at the far end were connected, a square wave will be obtained the period of which is related to the length of the transmission line in the well-known way, namely $$t = \frac{2S}{c}$$

where $t$ is the period, S the length and $c$ the velocity of light. Since it is known that a square wave may be approximated by the superposition of sinusoids of suitable periods and amplitudes, it is apparent that the reactance of the transmission line may be approximated in circuits similar to Fig. 4 and Fig. 4A by providing parallel combinations of networks such as those shown in those figures. Fig. 5 shows a parallel combination of two such networks in a circuit similar to Fig. 4 and Fig. 6 illustrates a parallel combination of $n$ such networks adapted to be inserted in a circuit such as Fig. 4 or Fig. 4A.

In connection with Fig. 5 it will be seen that insofar as the effect on the current flowing when the switch is closed are concerned, the effect of the network $L_1C_1$ and $L_2C_2$ will be simply additive. The response to the switching operation will be a combination of two sine waves the frequencies of which correspond respectively to the series-resonant frequencies of the combination $L_1C_1$ and $L_2C_2$ respectively and the amplitude of the two component oscillations will be respectively $$E \cdot \frac{C_1}{L_1} \text{ and } E \cdot \frac{C_2}{L_2}$$

As previously suggested, not all approximations of square waves by the superposition of sine waves are equally good. In this regard the problem of approximating a single square pulse such as may be formed by discharging a lossless transmission line through a resistance equal to its characteristic impedance is analogous to the problem of approximating a continuing square wave such as may be formed by discharging such a transmission line through a short circuit, both these problems being essentially the problem of simulating the reactance characteristics of a lossless transmission line. It is desired to obtain an approximation of these reactance characteristics which avoid excessive "overshoot" in the neighborhood of the discontinuity of the square wave which it is desired to approximate, and it is desired to achieve the approximation with the smallest possible number of reactive components. The nub of the problem with which this invention is concerned is therefore the determination of the desired frequencies of oscillation which should be provided by the network and the desired relative amplitudes at which these frequencies should be provided, and then to calculate, from such data and from the load impedance into which it is desired to operate the network, the magnitudes of the inductances $L_1, L_2 \ldots L_m$ and the capacitances $C_1, C_2 \ldots C_n$. In the circuit of Fig. 6 the products $L_1C_1, L_2C_2 \ldots L_nC_n$ will determine the resonant frequencies and the quotients $$\frac{C_1}{L_1}, \frac{C_2}{L_2} \ldots \frac{C_n}{L_n}$$

will determine the relative amplitudes of the component frequencies.

When it is desired to connect a load in the circuit to utilize the network response, it is important that the impedance of the load (that is, its voltage-current characteristics) should be such that the load can pass currents of the magnitude of those furnished by the network at the voltages impressed across the load by the network. Once a network of a desired reactance characteristic has been worked out corresponding networks for working into various load impedances may be designed simply by adjustment of all the C/L ratios together, as hereinafter more fully explained.

The task of obtaining the type of approximation of a rectangular pulse response which is shown in Fig. 3, the advantages of which have been previously described, is simplified by the symmetrical form of the rectangular pulse which suggests that the desired resonance frequencies for the network of the form of Fig. 6 are the harmonics (including, of course, the fundamental, which is the first harmonic) of a frequency determined by the desired pulse length in accordance with the relation $$f = \frac{1}{2\delta}$$

where $f$ is the frequency in cycles per second and $\delta$ is the pulse length in seconds.

In practice five of these frequencies, combined in the proper amplitudes, are able to form a response which approaches the desired rectangular pulse within a tolerance sufficiently small for useful purposes. Closer approximations may be obtained by including a larger number of resonant frequencies in the network. As is apparent from Fig. 6 the number of resonant frequencies bears a direct proportion to the number of reactive components in the network, being half the latter number.

From the above-noted facts concerning the resonant frequencies which the desired network may be expected to have, the conclusion may be drawn that what is required in order to furnish the desired type of approximation of a square wave (and finally, of a square pulse when the network is used to work into a resistance of the proper value) is a suitable modification of the values of the coefficients of the Fourier series approximation, the periodicity of the respective terms of the series being in this case unaltered. Since the difficulty with usual Fourier series approximations of a square wave or a square pulse, as illustrated in Fig. 2, occurs chiefly in the neighborhood of the corners of the wave, which is to say in the neighborhood of the discontinuities in the waves, it may be expected that if one attempts to approximate a curve which is less discontinuous in character, but still sufficiently similar to the square wave for practical purposes, a Fourier series approximation might be found which converges more rapidly in the neighborhood of the corners of the wave.

Figure 8:
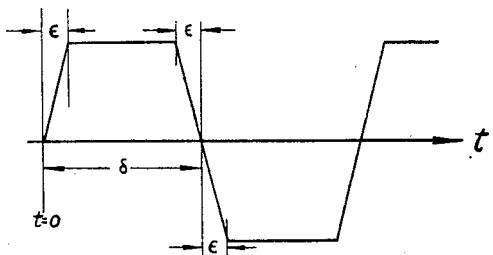
Figs. 8 and 9 are theoretical diagrams illustrating certain principles of the invention.

Instead of setting up a Fourier series to approximate a square wave, then, a trapezoidal type of wave, such as that shown in Fig. 8, may be considered. The rate of rise and fall in such a wave is no longer infinite, although it is quite steep. The time required for the rise, which is equal to the time for the fall is denoted by the value $\epsilon$. The function represented in Fig. 8 exhibits no discontinuity and its Fourier series converges more rapidly than that for the square wave functions, but for small values of $\epsilon$ the partial sum of this series still exhibits a tendency to overswing, although considerably less than is observed in the case of the square wave. Further reduction of the tendency to overswing in the neighborhood of the corners of the wave may be accomplished by considering a wave of a smoother sort. Mathematically the concept of smoothness involves absence of discontinuity not only in the function itself but in the derivatives of the function. Thus although the wave considered in Fig. 8 has no discontinuities, it does have a discontinuity in the first derivative. If a curve were substituted in which the first derivative is continuous, the Fourier series may be expected to converge more rapidly, and the provision of a curve in which not only the first derivative but also the second derivative exhibits no discontinuity may be expected to result in even more rapid convergence of the Fourier series. For practical purposes, sufficient improvement in the convergence of the Fourier series is obtained by providing a form of wave having no discontinuities in the first derivative as well as in the function itself, without considering the second and higher derivatives.

Figure 9:
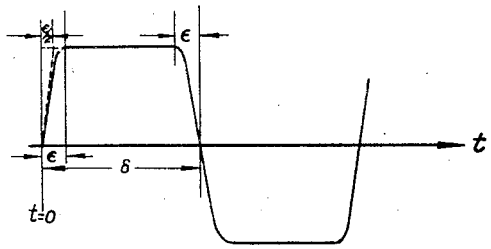

As noted in connection with Fig. 3, some overswinging can be tolerated provided the oscillatory deviation maintains an approximately constant amplitude over the constant portions of the function which is being approximated. It appears, therefore, that one may choose an approximating function of the form shown in Fig. 9. Here the rising portions of the functions are parabolic arcs, the apex of each arc joining smoothly with the adjacent constant portion. The time of rise is again denoted by $\epsilon$. It is interesting to observe that the slope at the points where the function passes through zero is such that the tangent drawn at these points intersects the final value after the time increment $$\frac{\epsilon}{2}$$

as shown on Fig. 9.

The coefficient of the sine terms in the Fourier series for this wave are found to be given by $$a_k = \frac{4}{k\pi} \left( \frac{\sin\left(\frac{\pi}{2} \frac{2\epsilon}{\tau}\right)}{k \frac{\pi}{2} \frac{2\epsilon}{\tau}} \right)^2 \quad (2)$$

in which $\tau$ is the period of the approximating function of Fig. 9 although for the limit $\epsilon \to 0$ this result coincides with the corresponding one for the square wave, as might be expected. For large $k$ the coefficients given by the above expression are proportional to $$\frac{1}{k^3}$$

while those for the square wave vary as $$\frac{1}{k}$$

Hence the series for the approximating function of Fig. 9 converges considerably more rapidly than that for the square wave, provided $\epsilon$ is not too small.

At this point a choice is to be made for the value of $\epsilon$, based upon a compromise between a desired rate of rise and a simultaneous desire to keep the total number of network elements to a minimum. Assuming that one wishes to limit the network to five series-resonant circuits (this limits the series to five sinusoidal terms), a satisfactory solution can be arrived at after several trials. The pulse duration obtained with the network, heretofore denoted by $\delta$, is recognized to be one-half of the period $\tau$, so that the expression for the coefficients of the series may be written as follows:

$$a_k = \frac{4}{k\pi} \left[ \frac{\sin\left(k\frac{\pi}{2}\frac{\epsilon}{\delta}\right)}{\left(k\frac{\pi}{2}\frac{\epsilon}{\delta}\right)} \right]^2 \quad (3)$$

The rate of rise is conveniently expressed by the ratio $$\frac{\epsilon}{\delta}$$

For the choice of $$\frac{\epsilon}{\delta} = 0.12$$

one finds the coefficient values

| $a_1$ | $a_3$ | $a_5$ | $a_7$ | $a_9$ | $a_{11}$ |
|---|---|---|---|---|---|
| 1.252 | 0.380 | 0.187 | 0.0978 | 0.0479 | 0.0269 |

Assuming that one wishes to limit the series to five terms, this looks like a reasonable compromise since the last coefficient, $a_{11}$, is only about 2% of the fundamental, $a_1$, and hence negligible if a 2% ripple can be tolerated.

Upon drawing the resultant curve for five sine terms with the coefficient $a_1$ to $a_9$ of the above table one finds this conclusion approximately substantiated. Some further slight modifications in the coefficient values (determined by trial) are, however, found to further improve the situation with regard to making the maximum values of the oscillatory deviation equal. The resulting coefficient values are found to be

| $a_1$ | $a_3$ | $a_5$ | $a_7$ | $a_9$ |
|---|---|---|---|---|
| 1.2575 | 0.3925 | 0.1735 | 0.0832 | 0.0502 |

These are accepted as a solution to the five-element network problem.

According to Equation 1 one then has for the element values $$a_k = \sqrt{\frac{C_k}{L_k}}; \quad \sqrt{L_k C_k} = \frac{\tau}{2\pi k} = \frac{\delta}{\pi k} \quad (4)$$

or $$C_k = \frac{\delta}{\pi k} a_k; \quad L_k = \frac{\delta}{\pi k} \frac{1}{a_k} \quad (5)$$

For $\delta = \pi$ seconds, these reduce to $$C_k = \frac{a_k}{k}; \quad L_k = \frac{1}{a_k k} \quad (7)$$

The network with these parameter values yields a transient current wave (for an applied unit step voltage) with unit amplitude. That is, it simulates a transmission line having a characteristic impedance of 1 ohm. To change this design to an R ohm level, the inductance values in Equation 5 are multiplied by R and the capacitance values are divided by R. The inductance and capacitance values given by Equation 6 are, then, to be multiplied respectively by $$\frac{R\delta}{\pi} \quad \text{and} \quad \frac{\delta}{\pi R}$$

to make them appropriate to a network having an R ohm impedance level and a pluse duration of $\delta$ seconds.

The subscripts of the coefficient $a$ given in the above table do not correspond with the numbering of the elements shown in Fig. 6, but instead with the order of the harmonics of the fundamental frequency $$\frac{1}{2\delta}$$

represented by the terms of which the quantity of $a_k$ are the coefficients.

The magnitude of the elements for a network of the type shown in Fig. 6 having five series-resonant circuits calculated from the formulae 6 are given in the following table, the subscript numbering of the elements being in accord with the notation of Fig. 6 instead of with the subscripts of the coefficients of the Fourier series. The inductances are given in henries and the capacitances are given in farads, the network being designed, as above indicated, for a pulse length of $\pi$ seconds and a characteristic impedance of 1 ohm. In practice very much shorter pulse lengths are desired and somewhat higher characteristic impedances are used, so that the above-mentioned relation for obtaining a network for other pulse lengths and other impedances is normally used. The pulse length of $\pi$ seconds and a network impedance of 1 ohm is a convenient reference standard because of its relation to the units involved.

Table I

| $L_1$ 0.795 | $L_2$ 0.849 | $L_3$ 1.1525 | $L_4$ 1.7175 | $L_5$ 2.325 |
|---|---|---|---|---|
| $C_1$ 1.2575 | $C_2$ 0.1308 | $C_3$ 0.0347 | $C_4$ 0.011875 | $C_5$ 0.00531 |

A network of the form shown in Fig. 6 will necessarily possess an anti-resonant frequency between each pair of consecutive resonant frequencies which is to say that the reactance function of the network will, as is well known, have a pole between each pair of consecutive zeros. In order to investigate the location of these anti-resonant frequencies for networks designed in accordance with the present invention, it is desirable to consider in a general way an alternate method for deriving the coefficients of a Fourier series which will serve to define the network, this time in terms of the anti-resonant frequency of the network. Then, by combining the results obtained from such investigations with the previously described result, it is possible to provide a more rapid method of obtaining the desired constants for a network of any desired number of components which avoids the necessity of the extensive calculations required in the type of derivations just outlined.

Figure 11:
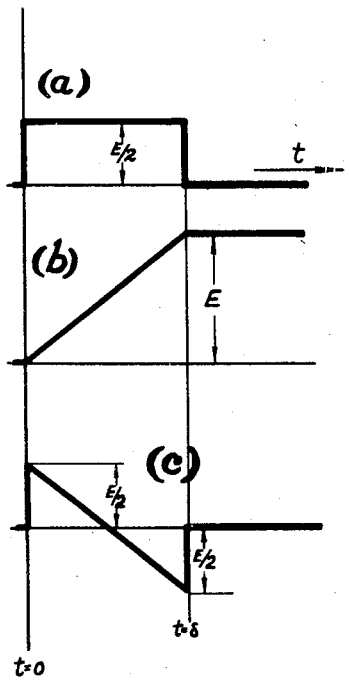
Fig. 10 is a diagram of a circuit to be considered in connection with the explanation of the invention and Fig. 11 is a diagram of certain conditions in the circuit of Fig. 10.
Figure 10:
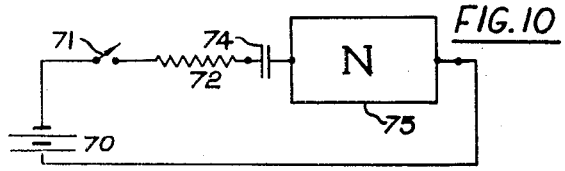

For this further investigation, the circuit of Fig. 10 should be considered. In Fig. 10 is shown a source of voltage (the battery 70), a switch 71, a resistance 72, and a reactive network including, in series, the condenser 74 and the subsidiary network N. If now it is desired by suddenly closing the switch 71 and thereby introducing the voltage E into the circuit, to cause a single rectangular pulse of current to flow in the resistance R, the corresponding voltage condition across the resistance 72, across the condenser 74 and across the network N will be represented respectively by the curve (a), (b) and (c) of Fig. 11. As required by hypothesis, the sum of these curves is a step wave of voltage, the voltage being equal to zero for $t<0$ and being equal to E for $t>0$. The amplitude of the rectangular pulse shown at (a) is E/2. The voltage curve (c) of Fig. 11 is a single oscillation of a saw-tooth wave, going from $+E/2$ to $-E/2$.

Figure 12:
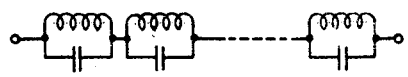
Fig. 12 is a diagram of the form of the network N of Fig. 10 as suggested from observation of Fig. 11.

It is known that if a constant current I is suddenly impressed upon a simple anti-resonant combination consisting of an inductance and capacitance in parallel, the resulting transient voltage drop is given $$e(t) = I\sqrt{\frac{L}{C}} \sin \frac{t}{\sqrt{LC}} \qquad (7)$$

the periodic saw-tooth wave may be approximated by a finite sum of sine terms such as the right-hand side of Equation 7, so that the resultant network N may assume the form shown in Fig. 12, in which each anti-resonant component places one sine term in evidence.

The above considerations serve to give a general indication of the form of network in question, but in order to obtain a type of reactance function in accordance with the present invention, the notion of approximating a square wave is to be modified as before, by the concept of approximating a trapezoidal network response, admitting a finite rate of rise in the time increment $\epsilon$. For this purpose the circuit of Fig. 13 should be considered. This corresponds to the circuit of Fig. 10 except that an inductance 76 has been added in series with the other reactive components. The subsidiary network is shown at N'. As will presently be shown, the inductance 76 is necessary for obtaining the trapezoidal form of response, and although it might be considered as being part of the network N', it is shown separately in order that the network N' may have the form of Fig. 12. The entire reactive network the design of which is here being considered consists of the capacitance 74, the subsidiary network N' and the inductance 76.

Figure 13:
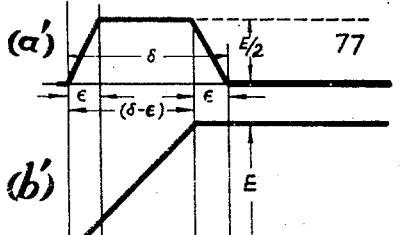
Fig. 13 is a diagram of another circuit to be considered in connection with the explanation of the invention and Fig. 14 illustrates conditions occurring in the circuit of Fig. 13.
Figure 13:
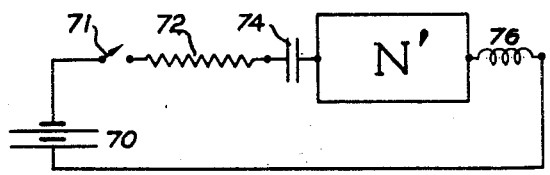
Figure 14:
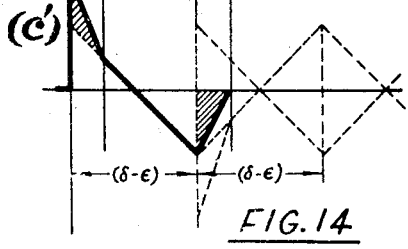

The conditions to be produced in the reactive network of Fig. 13 are shown in Fig. 14. Curve (a') of Fig. 14 represents the voltage across the resistance 72. Since a trapezoidal current pulse beginning when the switch 71 is closed at the time $t=0$, the voltage across this resistance will be trapezoidal as shown in the curve (a') and the amplitude will be $$\frac{E}{2}$$

since it is desired that the voltage should divide between the resistance and the network.

It will be noted that the trapezoidal pulse shown in the curve (a') may be considered as made up of two step waves, each having a slanting front edge, the first being a positive step wave including the left-hand edge of the trapezoidal pulse and continuing as shown by the dotted line 77, and the second being a negative step wave including the right-hand edge of the trapezoidal pulse and continuing thereafter along the axis of abscissae. The interval between the two step waves is not $\delta$ but $(\delta-\epsilon)$. The curve (b') indicates the voltage in the condenser 74. It will be noted that this voltage reaches a substantially constant value at the time $(\delta-\epsilon)$.

The diagram (c') represents the voltage drop which the network N' and the inductance 76 should provide so that the total voltage in the circuit exclusive of that provided by the battery 70 will be equal to E after the closing of the switch 71 at the time $t=0$. The shaded portions of the diagram (c') represent the effect of the inductance 76. It will be seen that if the shaded portions are left out of account, the rest of the diagram (c') is made up of two sawtooth waves each having a period of $(\delta-\epsilon)$, one beginning at $t=0$ and the other beginning at $t=\delta-\epsilon$. Each of these waves correspond to one of the step waves making up the diagram (a'). These sawtooth waves cancel each other at all times after $t=\delta-\epsilon$, so that the resultant oscillation is a single sawtooth oscillation. It is now seen that in order that the voltage across the network N' may be represented by a sawtooth oscillation, so that the network N' may be provided in the form shown in Fig. 12, it is necessary to add the inductance 76 in series in order to provide the addition to the voltage curve of the diagram (c') represented by the shaded areas, so that the total voltage in the circuit will satisfy the necessary condition heretofore stated.

From this point the procedure may be refined by substituting a smoother curve for the trapezoids shown in the diagram (a'), then by choosing a suitable value of $\epsilon$ in terms of $\delta$, trying out this value and, if necessary, redefining $\epsilon$, as before. This scheme of calculation of the components of the network is less convenient than that previously derived for the type of network shown in Fig. 6, it being difficult to obtain a suitable value for the inductance 76, but since the network shown in Fig. 13 is related to that of Fig. 6, as hereinafter more fully pointed out, by well-known network transformation theorems, both networks having identical reactance functions, the exact values for the components of the type of network shown in Fig. 13 which is incidentally the same type of network as that shown in Fig. 1, may be obtained from the values derived in connection with Fig. 6.

The utility of the above investigation of Fig. 13 lies in the fact that the curve ($c'$) of Fig. 14 shows that the perodicity of the saw-tooth wave which is to be approximated by a series concatenation of parallel resonant circuits is ($\delta-\epsilon$) and not $\delta$, which is to say that the anti-resonant frequencies of the network will be harmonically related not to $\delta$, but to ($\delta-\epsilon$). Since the networks of Fig. 13 and that of Fig. 6, as will presently be pointed out, have the same reactance functions for the same number of components, the anti-resonant frequencies of the network of Fig. 6 will be the same as those just derived in connection with Fig. 13.

From a further consideration of the results brought out in connection with Figs. 13 and 14 it is possible to obtain an expression for the anti-resonant frequencies in terms of $\delta$ and the number of reactive components in the network, which is $2n$, $n$ being the number of resonant frequencies. Thus the periodic current wave corresponding to the trapezoidal pulse shown in Fig. 14 is approximately given by the following partial sum of a Fourier series:

$$i(t) = \frac{4}{\pi}\left(\sin \omega t + 1/3 \sin \omega 3t + \ldots + \frac{1}{n} \sin n\omega t\right)$$

whence $$\left(\frac{di}{dt}\right)_{t=0} = \frac{4}{\pi}(\omega+\omega+\ldots+\omega) = \frac{4n\omega}{\pi} = \frac{4n}{\tau/2} = \frac{4n}{\delta}$$

Letting the rising part of the trapezoid be given by the tangent to the $i(t)$ curve at $t=0$, rounding the top of the rising part as in Fig. 9, and redefining as shown in that figure, one has for a current wave of unit amplitude $$\left(\frac{di}{dt}\right)_{t=0} = \frac{1}{\epsilon/2} = \frac{4n}{\delta}, \quad \text{or} \quad \epsilon/\delta = 1/2n$$

whence the fundamental period of the saw-tooth wave, which is $\delta-\epsilon$, is shown to be $$\delta\left(1-\frac{1}{2n}\right)$$

and the fundamental frequency of this wave is seen to be $$\frac{1}{\delta\left(1-\frac{1}{2n}\right)} \quad \text{or} \quad \frac{1}{\delta}\cdot\frac{2n}{2n-1}$$

It is to be expected that for curves using "smooth" approximations to a square wave other than the curve having parabolic arcs as in Fig. 9, the initial slope may have a slightly different relation to $\epsilon$, $\delta$ and $n$. The variation is not likely to be great so that the formula $$\frac{2n}{2n-1}\cdot\frac{1}{\delta}$$

for the fundamental anti-resonant frequencies of networks of the form shown in Fig. 6 may be treated as substantially representative of the results to be obtained by any practical approximation to the square wave by means of non-discontinuous and relatively smooth function. In practice minor variations from the values of anti-resonant frequencies predicted by the formula can be tolerated. The relation $$\frac{2n+1}{2n}\cdot\frac{1}{\delta}$$

for instance, seems to produce equally good results in practice. For reasonably large $n$, of course, $$\frac{2n+1}{2n}$$

is practically the same as $$\frac{2n}{2n-1}$$

As another example of variations to be expected, calculation of the anti-resonant frequencies of the network given by Table I (which is readily done by reference to the equivalent network of Table II, below) will show that the higher anti-resonant frequencies are slightly less than the corresponding multiples of $$\frac{2n}{2n-1}\cdot\frac{1}{\delta}$$

These frequencies are derived from the calculations outlined in connection with Fig. 9, so that the variations from the formula are really but a measure of the accuracy of the calculations and the method of computation used. A network such as that given by Table I, or the equivalent network of Table II will provide a substantially square pulse with practically no ripples and without the characteristic overshoot of certain other types of networks, when used in a circuit such as that of Fig. 1.

From the above considerations it is seen that the ratio of the anti-resonant frequencies of a network according to the present invention to the arithmetic means between successive resonant frequencies of such network may be treated as being approximately equal to $$\frac{2n}{2n-1}$$

The said arithmetic means are the anti-resonant frequencies of a lossless transmission line which the network simulates. The reactance function of networks in accordance with the present invention will, therefore, appear substantially as is shown in Fig. 7, which illustrates the case of an eight-component network. In Fig. 7 the resonant frequencies (where the reactance passes through zero) are indicated by small circles and the anti-resonant frequencies (which are poles of the reactance function) are indicated by crosses.

It is known that a reactance function is completely determined by the location of its poles and zeros, except for one additional parameter, which in this case corresponds to the factor necessary for setting the desired characteristic impedance of the network and the desired pulse length. Thus the relative magnitude of the inductances and capacitances may be completely determined from the desired resonant and anti-resonant frequencies. From the above-derived relation between the resonant and anti-resonant frequencies, illustrated for the case of an eight-component network in Fig. 7, the elements of the network may then be derived directly from these frequencies, instead of from one set of these frequencies and a computation of the amplitude corresponding thereto.

It will be seen from Fig. 7 that the networks according to the present invention, although they do simulate, in their response in a circuit such as Fig. 1, the reactive characteristics of a lossless transmission line which has some critical frequencies the same as the corresponding critical frequencies of the network, possess reactance characteristics which differ substantially from those of the transmission line simulated, even within the range of the first $n$ harmonics of the frequency $$f = \frac{1}{2\delta}$$

Speaking loosely, it may be said that the deviation of the network reactance characteristic from the transmission reactance characteristic at low frequency to some extent makes up for the failure of the network to include the higher resonant frequencies present in the reactance characteristic of the transmission line. Thus a good approximation of the desired rectangular pulse may be obtained with a relatively small number of resonant frequencies (and consequently with a relatively small number of components).

The zeros of a reactance function define one set of "critical frequencies" of the corresponding network and the poles of the reactance function define the other set of "critical frequencies" of such network. The term "critical frequencies" is commonly used in connection with reactive networks to denote collectively the frequencies of resonance and anti-resonance (zero and "infinite" reactance).

In the present discussion, the matter of network losses has been neglected and attention has been focused upon the reactance characteristics alone, because it is possible to produce inductances and capacitances having sufficiently low losses so that the behavior of the network may for all practical purposes be considered as purely reactive. The taking account of network losses, if desired in special cases, for such losses as may occur, does not present any particularly difficult problem, since the relative magnitude of such losses may be kept quite small.

Figure 15:
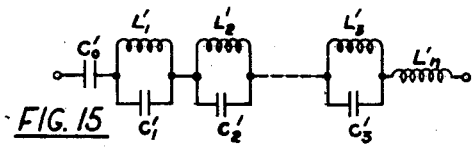
Figs. 15, 16, 17, 18, 19, 20 and 21 are schematic diagrams of forms other than that of Fig. 6 in which networks in accordance with the present invention may be constituted.
Figure 16:
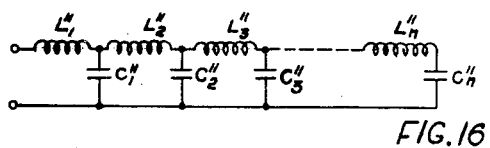
Figure 17:
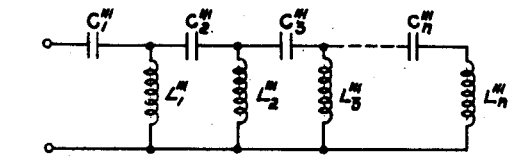

When well-known network equivalence theorems are used various other forms of networks may be found which will be the equivalents of the form of network shown in Fig. 6 and constituted in accordance with this invention as above described, once the values of the components of the network of Fig. 6 have been obtained in accordance with one of the above-outlined procedures. Because of the equivalence of these forms of networks, they may all be represented by a reactance function of the general form of Fig. 7. In particular it is to be noted that these various equivalent networks will have identical resonant and anti-resonant frequencies. The fundamental network forms equivalent to the forms shown in Fig. 6 are shown in Figs. 15, 16 and 17. Values of the inductances and capacitances of the components of these networks for conditions mentioned in connection with Table I are given in Tables II, III, and IV. Values of inductances and capacitance for other pulse lengths and/or network impedances may be obtained in the same manner as that described in connection with Fig. 6.

Table II (corresponding to Fig. 15)

| $L_1'$ | $L_2'$ | $L_3'$ | $L_4'$ | $L_5'$ |
|---|---|---|---|---|
| 0.2806 | 0.06354 | 0.02341 | 0.008137 | 0.2454 |

| $C_0'$ | $C_1'$ | $C_2'$ | $C_3'$ | $C_4'$ |
|---|---|---|---|---|
| 1.4310 | 0.7371 | 0.8141 | 0.9846 | 1.589 |

Table III (corresponding to Fig. 16)

| $L_1''$ | $L_2''$ | $L_3''$ | $L_4''$ | $L_5''$ |
|---|---|---|---|---|
| 0.2454 | 0.1986 | 0.2067 | 0.2431 | 0.3435 |

| $C_1''$ | $C_2''$ | $C_3''$ | $C_4''$ | $C_5''$ |
|---|---|---|---|---|
| 0.2030 | 0.2017 | 0.2210 | 0.2797 | 0.5259 |

Table IV (corresponding to Fig. 17)

| $L_1'''$ | $L_2'''$ | $L_3'''$ | $L_4'''$ | $L_5'''$ |
|---|---|---|---|---|
| 0.614 | 0.573 | 1.33 | 5.75 | 66.7 |

| $C_1'''$ | $C_2'''$ | $C_3'''$ | $C_4'''$ | $C_5'''$ |
|---|---|---|---|---|
| 1.44 | 0.1696 | 0.0284 | 0.00379 | 0.0002374 |

The form of network shown in Fig. 15 is known as the "Foster canonical form," the form of network shown in Fig. 16 is known as the "Cauer canonical form" and the form of network shown in Fig. 17 is known as the "Cauer alternate form." The procedure for obtaining the constants of one of these forms of network for equivalence with a network of one of the other forms of which the constants are given is explained in well-known texts, such as T. E. Shea, Transmission Networks and Wave Filters (D. Van Nostrand Co., Inc., New York, 1929) chapter V, p. 124, or E. A. Guillemin, "Communication Networks," vol. II (John Wiley and Sons Inc., New York, 1935) chapter V, p. 184.

Figure 18:
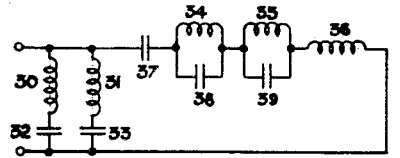

Still other equivalent forms of networks, in addition to the fundamental equivalent forms just described can also be provided. For instance, part of a network in some of these fundamental forms may be replaced by its equivalent form in any of the other fundamental forms. Fig. 18 illustrates such an arrangement. The first part of the network of Fig. 18, comprising the inductances 30 and 31 and the capacitances 32 and 33, has the general form shown in Fig. 6, whereas the part of the network comprising the inductances 34, 35, and 36 and the capacitances 37, 38, and 39 as the forms shown in Fig. 15.

In practice, for the production of short pulses in loads from several hundred to about a thousand ohms, networks of the form of Fig. 15 and networks of the form of Fig. 16 are to be preferred because the components of networks of the form of Fig. 6 or of the form of Fig. 17 relating to the higher frequencies involve the use of extremely small condensers and rather large coils. This difficulty may to some extent be avoided by replacing the higher frequency part of the network shown in Fig. 6 by a network of some other type, after the fashion shown in Fig. 18. The forms of network shown in Fig. 15 and Fig. 17 have an advantage in that only the input condenser need be able to withstand the full exciting voltage, while the other condensers may safely be built with substantially lower voltage ratings.

Figure 19:
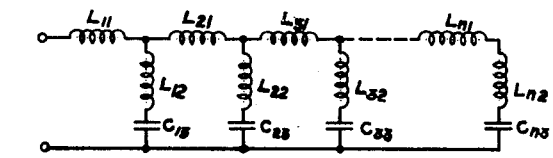

Still another form of network equivalent to the network described by Fig. 6 and Table I is shown in Fig. 19, the values of the inductances and capacitances being given in Table V for conditions corresponding to those for which the previous tables were calculated. It is to be noted that the inductances $L_{12}$, $L_{22}$, $L_{32}$ and $L_{42}$ are all negative. In fact the inductance $L_{n2}$ is likewise negative but since it can readily be combined with $L_{n1}$, these two inductances are combined in the tables and a single value for a single inductance $L_{n12}$ to replace these two inductances is given in Table V ($n$ in this case being 5). The effect of negative inductances in series with the condensers $C_{13}$, $C_{23}$ and so on can be obtained in practice by providing mutual inductance resulting from the coupling of coils connected in the position of $L_{11}$, $L_{21}$, $L_{31}$ and so on. It is to be noted in this connection that the values of inductance and capacitance given in the previous tables relating to Figs. 6, 15, 16, and 17 hold only for absence of inductive coupling between the inductances, modification of the values given being necessary when the network is modified to include such coupling.

Table V (corresponding to Fig. 19)

| $L_{11}$ 0.2872 | $L_{21}$ 0.2857 | $L_{31}$ 0.2854 | $L_{41}$ 0.2846 | $L_{(51+52)}$ |
|---|---|---|---|---|
| $L_{12}$ −0.03564 | $L_{22}$ −0.03833 | $L_{32}$ −0.03715 | $L_{42}$ −0.02410 | 0.2770 |
| $C_{13}$ 0.286 | $C_{23}$ 0.286 | $C_{33}$ 0.286 | $C_{43}$ 0.286 | $C_{53}$ 0.286 |

The derivation of the values of Table V is a little more complicated than that of the values of the components of the other variant networks heretofore mentioned. In order that the derivation of these values may be made clear, some remarks should first be made on the procedure used to obtain the network of Fig. 16.

The reactance function, which may be the same for Fig. 16 and Fig. 19, may be denoted by $Z(\lambda)$, having zeros at values of $\omega$ (angular frequency) equal to $\omega_1$, $\omega_3$ ... $\omega_{2n-1}$ and having poles at 0 and at infinity and at values of $\omega$ equal to $\omega_2$, $\omega_4$ ... $\omega_{2n-2}$. The function has the polynomial form:

$$Z(\lambda) = \frac{\alpha_{2n}\lambda^{2n} + \alpha_{2n-2}\lambda^{2n-2} + \ldots + \alpha_2\lambda^2 + \alpha_0}{\beta_{2n-1}\lambda^{2n-1} + \beta_{2n-3}\lambda^{2n-3} + \ldots + \beta_3\lambda^3 + \beta_1\lambda} \quad (8)$$

in which $\lambda = j\omega$.

The function also has the partial fraction expansion:

$$Z(\lambda) = \frac{k_0}{\lambda} + \frac{2k_2\lambda}{\lambda^2 - \lambda_2^2} + \frac{2k_4\lambda}{\lambda^2 - \lambda_4^2} + \ldots + \frac{2k_{2n-2}\lambda}{\lambda^2 - \lambda_{2n-2}^2} + k_{2n}\lambda \quad (9)$$

in which $\lambda_2, \lambda_4 \ldots \lambda_{2n-2}$ are the roots of the denominator polynomial in Equation 8. In particular, the term $k_{2n}\lambda$ in Equation 9 represents the pole at $\lambda = \infty$.

From Equation 9 it is clear that $$k_{2n} = \frac{\alpha_{2n}}{\beta_{2n-1}} \quad (10)$$

The partial fraction expansion, Equation 9, leads at once to the network given in Fig. 15, by identifying each term with a corresponding series component. That is, each term in the expansion (9) places a pole of the function in evidence and so does each component series impedance in Fig. 15 ($C'_0$, parallel combination of $L'_1$ and $C'_1$, other parallel combinations, and finally $L'_n$ respectively). The network of Fig. 15 may thus be obtained by "removing" all of the poles of $Z(\lambda)$ at once.

The network of Fig. 16, on the other hand, is to be obtained by successive steps each of which "removes" only one pole. In the first step, the pole at $\lambda = \infty$ is removed. This is represented by $L_1'' = k_{2n}$. The remainder, which is given by Equation 9 with the last term removed, is a quotient of polynomials in which the denominator is one degree higher than the numerator. Its inverse function, which is a susceptance function, therefore has a pole at infinity. This is next removed by the same procedure as that used for the removal of the pole of $Z(\lambda)$ at $\lambda = \infty$, and yields the shunt capacitance $C_1''$ of Fig. 16. The succeeding remainder is, after inversion, again a reactance function of the same form as $Z(\lambda)$ except that it contains one less zero and pole. The above-described operations are then repeated, yielding the elements $L_2''$ and $C_2''$ of Fig. 16, and so forth until all zeros and poles are exhausted. This procedure may be regarded as a continued fraction expansion of the reactance function.

The capacitance values $C_1''$, $C_2''$, ... are in general not alike. It is desired to modify the procedure in such a way as to make the capacitance obtained in each cycle of operations have the same value. In this connection it is observed that for zero frequency the networks of Figs. 16 and 19 both reduce to pure capacitance, the network of Fig. 16 reducing to $C_0 = C_1'' + C_2'' + \ldots + C_n''$ and the network of Fig. 19 reducing to a capacitance equal to $C_{13} + C_{23} + \ldots + C_{n3}$, which must also equal $C_0$. But since $C_{13} = C_{23} = \ldots = C_{n3}$, it follows that these must have the common value $C_0/n$.

The initial step in the modified procedure is again to remove a series inductance, but since it is desired to control the value of capacitance which is encountered in the succeeding step in the cycle of operations, it is clear that the value of the inductance to be removed in the first step cannot be equal to $k_{2n}$ as before but remains for the moment undetermined. If this is denoted by $L_{11}$, one encounters, after its removal, the remainder function $$Z(\lambda) = Z(\lambda) - L_{11}\lambda \quad (11)$$

which (in view of the fact that the numerator of $Z_1(\lambda)$ is a polynomial in $\lambda^2$) has a zero at the frequency $\lambda^2 = \lambda_k^2$ defined by $$Z(\lambda_k) - L_{11}\lambda_k = 0 \quad (12)$$

whence $$L_{11} = \frac{Z(\lambda_k)}{\lambda_k} \quad (13)$$

and $$Z_1(\lambda) = Z(\lambda) - \frac{Z(\lambda_k)}{\lambda_k}\lambda \quad (14)$$

The susceptance function $$Y_1(\lambda) = \frac{1}{Z_1(\lambda)} \quad (15)$$

evidently has a pole at the frequency $\lambda^2 = \lambda_k^2$, and hence admits of the representation $$Y_1(\lambda) = \frac{2a\lambda}{\lambda^2 - \lambda_k^2} + Y_2(\lambda) \quad (16)$$

According to established mathematical theory $$\frac{1}{a} = \left(\frac{dZ_1}{d\lambda}\right)_{\lambda = \lambda_k} = \left(\frac{dZ}{d\lambda} - \frac{Z}{\lambda}\right)_{\lambda = \lambda_k} = \lambda_k\left[\frac{d}{d\lambda}\left(\frac{Z}{\lambda}\right)\right]_{\lambda = \lambda_k} \quad (17)$$

The first term of Equation 16 represents the susceptance of an inductance $L_k$ and a capacitance $C_k$ in series, with $$L_k = \frac{1}{2a}, \text{ and } L_kC_k = \frac{-1}{\lambda_k^2} \quad (18)$$

Equations 17 and 18 yield $$\frac{1}{C_k}=S_k=\frac{-\lambda_k^2}{2a}=-\frac{\lambda_k^2}{2}\left[\frac{d}{d\lambda}\left(\frac{Z}{\lambda}\right)\right]_{\lambda=\lambda_k} \quad (19)$$

$S_k$ is the elastance corresponding to the capacitance $C_k$. Using Equation 9 for the analytic representation of $Z(\lambda)$, one finds after working out the differentiation indicated in (19)

$$S_k = \left[k_0+\frac{2k_2\lambda^4}{(\lambda^2-\lambda_2^2)^2}+\frac{2k_4\lambda^4}{(\lambda^2-\lambda_4^2)^2}+\cdots+\frac{2k_{2n-2}\lambda^4}{(\lambda^2-\lambda_{2n-2}^2)^2}\right]_{\lambda=\lambda_k} \quad (20)$$

The expression appearing in the square bracket is a function of $\lambda^2$ which for convenience may be denoted by $S(\lambda^2)$. It should be observed that $$\lambda_2^2=-\omega_2^2, \lambda_4^2=-\omega_4^2, \text{ etc.}$$

in which $\omega_2, \omega_4, \ldots$ are the finite frequencies at which the original function $Z(\lambda)$ has poles. Hence one may write $$S(\lambda^2)=$$

$$k_0+\frac{2k_2\lambda^4}{(\lambda^2+\omega_2^2)^2}+\frac{2k_4\lambda^4}{(\lambda^2+\omega_4^2)^2}+\cdots+\frac{2k_{2n-2}\lambda^4}{(\lambda^2+\omega_{2n-2}^2)^2} \quad (21)$$

Since $C_k$ is supposed to have the value $C_0/n$, i. e. $S_k$ should equal $n/C_0$, one may use Equation 21 to find that value of $\lambda^2$ for which $S(\lambda^2)$ equals the prescribed value $S_k$. This value of $\lambda^2$ is $\lambda_k^2$. Once this is known the value of $L_{11}$ follows from Equation 13, and $L_k$ from Equations 17 and 18, so that the first cycle in the contemplated procedure will be completed.

For positive real values of $\lambda^2$, the function $S(\lambda^2)$ is seen to increase continuously from the value $k_0$ at $\lambda^2=0$ to the value $k_0+2k_2+2k_4+\ldots+2k_{2n-2}$ at $\lambda^2=\infty$. Hence if Equation 21 is plotted against $\lambda^2$, the value of $\lambda^2=\lambda_k^2$ for which $S(\lambda^2)$ equals $S_k$ may graphically be found. Since $\lambda_k^2=-\omega_k^2$, the corresponding radian frequency $\omega_k$ turns out to be imaginary. This means that the value of $L_k$ becomes negative, but $L_{11}$ is positive. In the complete structure of Fig. 19 the series inductances $L_{11}, L_{21}$, etc. are all positive, while the shunt inductances $L_{12}, L_{22}$, etc. are negative. These negative inductances may be realized physically in the form of mutual inductances as shown in Fig. 20.

It is understood that the remainder $Y_2(\lambda)$ appearing in Equation 16 when inverted is a reactance function like $Z(\lambda)$ but with one less zero and pole. The same procedure is applied to this inverted remainder as was applied to $Z(\lambda)$, and this is continued until all zeroes and poles are removed.

Figure 20:
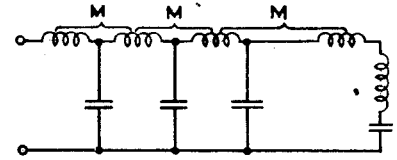

Fig. 20 illustrates the manner in which a network of the form shown in Fig. 19 may be physically realized, the brackets indicating the presence of mutual inductance resulting from coupling. Indeed the inductances shown to be coupled may all be wound in the form of a single continuous solenoid. It will be noted that the network of Fig. 19, as shown in Table V, makes possible the use of condensers of equal capacitance. For the physical realization of such a network after the manner shown in Fig. 20, by winding the coupled inductances in the form of a continuous solenoid, it is generally necessary to divide the solenoid into portions of different diameter in order to obtain the proper amount of mutual inductance. A cut-and-try procedure is usually necessary, the result of each try being checked by inductance measurements to see that the values corresponding to the form of network shown in Fig. 19 are obtained. It will be noted from Table V that the component positive inductances of the network of Fig. 19 do not differ greatly from each other in magnitude and that the negative inductances are likewise of the same order of magnitude. This indicates that another substantially equivalent network may be obtained in which all the inductance forms a single continuous-tapped solenoid of uniform diameter, a form of inductance that is particularly favorable for manufacture. It has been confirmed experimentally that such a network can be obtained and a suitable method of constructing such networks for various pulse lengths and load impedances will now be described.

Figure 21:
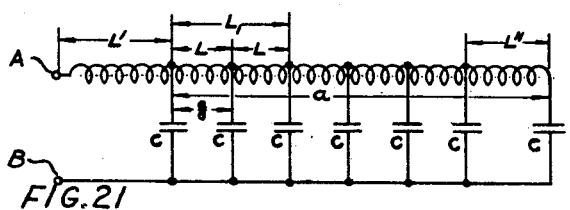

The network is illustrated in Fig. 21. It comprises a tapped solenoid inductance and a bank of seven condensers. A seven-section network provides a sufficiently good pulse shape for practical purposes and is not inconveniently large or inconveniently expansive. The provision of as many as seven sections causes the exact magnitude of the capacitances to become less critical, thus permitting greater manufacturing tolerances and design allowances than if a small number of sections, such as four or five, were used. The taps on the solenoid inductance are so spaced that all the resulting divisions of the solenoid except for the two-terminal portions have an identical number of turns and an identical length, so that they will have identical inductances, of a value $L$. The seven condensers are all of the same magnitude, having a value $C$. The values of $L$ and $C$ may be worked out exactly by the principles of the present invention, but it is more convenient to use the approximate formula $$C=0.065\frac{\delta}{R}; L=0.0714\frac{\delta}{R}$$

These formulae will give $C$ and $L$ in farads and henries respectively if $\delta$ is expressed in seconds, and will give $C$ and $L$ in microfarads and microhenries respectively if $\delta$ is expressed in microseconds.

In order that the network of Fig. 21 may be constructed and operate in accordance with the present invention, it is necessary to adjust properly the coupling between successive sections of the tapped solenoid, and it is also necessary to make an adjustment of the end sections of the tapped solenoid. In the case of the latter adjustment, the present invention is employed to determine by a semi-experimental method the magnitude of the inductances necessary to provide the network with anti-resonant frequencies distributed as above described, in order that the network may function to provide a substantially square pulse with practically no "overshoot" when excited in a suitable circuit.

It has been experimentally determined that a good pulse shape will be obtainable if the coefficient of coupling between adjacent portions of the tapped solenoid is equal to about 0.15. This relation may be readily obtained by the following practical procedure. The overall distance required for the solenoid except for the left-hand portion, which is to say the distance $a$ in Fig. 21 is first measured. This distance will usually be practically determined by the size of the condensers, which are preferably mounted in a row next to the solenoid. A coil form of a suitable diameter and wire size are selected which, when the wire is wound on the form with wires touching, to a length equal to ⅛ of the dimension $a$, will give approximately the specified $L$, coil sections with fractional turn at the end of the section being avoided for purposes of symmetry. A coil of the same size wire on the same diameter form is then wound with double the number of turns and its inductance, which may be referred to as $L_1$, is measured. If the inductance $L_1$ equals 2.3L, the coil form diameter and wire size are suitable for a tapped solenoid of the type shown in Fig. 21. If this relation between $L_1$ and L does not hold, however, the coil form diameter and wire size should be changed until a combination is found for which this relation does hold. The use of well-known tables and "lightning calculators" will serve to expedite the selection of a wire size and form diameter which will satisfy the conditions just described.

The solenoid is then wound and the taps made to provide five equal sections, each of a length $a/6$ and of an inductance L. The next step in the procedure is to adjust the number of turns in the end sections of the solenoid to obtain the desirable network characteristics. The input coil shown at the left of Fig. 21, the inductance of which may be denoted by L', will usually have an inductance lying between 1.1L and 1.5L, whereas the terminal section of the solenoid at the other end, the inductance of which may be denoted by L", will usually have an inductance between 1.1L and 1.4L. The values of L' and L" are to be determined by the frequency response of the network. The input terminals of the network indicated on Fig. 21 at A and B are for this purpose connected in a measuring circuit with a suitable signal generator for determination of the antiresonant frequencies of the network. In accordance with the present invention, using the $$\frac{2n}{2n-1}$$

formula, $n$ being 7 in this case, the anti-resonant frequencies should appear at $1.08/\delta$ cycles per second, $2.16/\delta$ cycles per second, and so on. For practical purposes, only the first four anti-resonant frequencies need be measured. It will usually be found that the inductance L" has the greatest effect on the linearity of distribution of the anti-resonant frequencies and that the inductance L' has the effect of shifting all the frequencies slightly in the same direction. L' and L" are adjusted to bring the anti-resonant frequencies close to the values previously determined in accordance with the present invention. Thereafter the network may be placed in a pulse-generating circuit and the pulse shape checked. Further modifications of a minor sort may then be made on a purely experimental basis, keeping in mind that the inductance L' tends to control the rate of rise, or overshoot, at the leading edge of the pulse, and that the inductance L" tends to control wiggles on the top of the pulse near the trailing edge. L" appears to be more critical of adjustment than L'.

This semi-experimental design using the principles of the present invention has the particular advantage that it provides a check on stray mutual inductances not provided for in the straightforward design procedure but which may nevertheless creep into the construction. For accurate results a similar procedure may be useful in connection with various types of networks herein described in addition to the type shown in Fig. 21.

Figure 32:
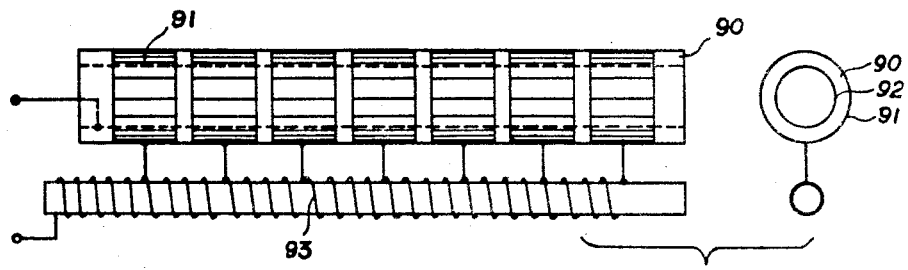
Fig. 32 shows in side and end elevation a possible form of physical construction for networks of the type of Fig. 21.
Figure 33:
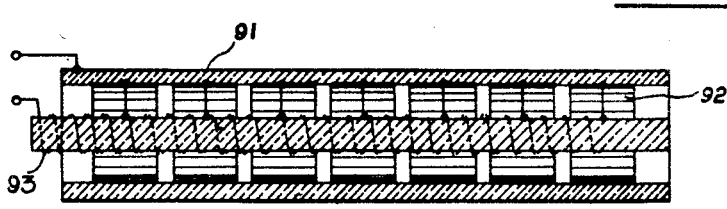
Fig. 33 shows, in longitudinal cross-section, another possible form of physical construction for networks according to Fig. 21.

Figs. 32 and 33 illustrate the methods of physical construction for the network shown in Fig. 21 which may be used instead of the conventional construction of a bank of condensers of the usual type lined up alongside a solenoid. The arrangements shown in Figs. 32 and 33 make use of condensers formed by cylindrical silver bands mounted on a tubular piece of dielectric material.

The dielectric cylinder is shown at 90. The surface of the cylinder 90 is provided with silvered bands both on the outside as at 91 and on the inside as at 92. These silvered bands may be formed by sputtering silver on the entire surface of the dielectric cylinder and then removing the silver coating in strips to divide the silvered surface into discrete bands. If desired the silver surfaces may be electroplated and polished. One of the surfaces, either inside or outside, whichever surface is connected to the terminal B of Fig. 21, may be continuous, since in the circuit of Fig. 21 all the condensers have one terminal connected to B. In Fig. 32 the inner silvered surface is provided in continuous form, whereas in Fig. 33 the outer silvered surface 91 is continuous while the silvered portions of the inner surface 92 are separate. Suitable connecting wires may be silver-soldered to the silvered surfaces, as indicated generally in both figures. In Fig. 32 the solenoid 93 is shown located outside of a parallel to the cylinder 90. In Fig. 33 the solenoid 93 is located inside the dielectric cylinder 90. The structure of Fig. 33 is particularly compact and has the further advantage that the outside silvered surface is all at the same potential, which in some circuits may be arranged to be ground potential. Suitable insulating supports may be provided in the structure of Fig. 33 for maintaining the alignment of the elements for purposes of insulation.

Figure 22:
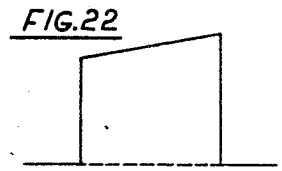
Fig. 22 is a diagram of a modified form of pulse which may be produced with certain networks constituted in accordance with the present invention.

Because of the presence of a single series condenser at one end of the network, the forms of network shown in Fig. 15 and in Fig. 17 have a peculiar property which is of use in some types of pulse-forming circuits. If this input condenser, which is shown at $C_0'$ in Fig. 15 and $C_1'''$ in Fig. 17, is made slightly smaller than the corresponding values given in Tables 2 and 4 respectively, the network response pulse tends to take the shape shown in Fig. 22. This shape is characterized by a rising "top." Dissipation in the network tends to cause the top of the pulse to fall slowly during the pulse duration, so that the tendency to form a pulse of the shape shown in Fig. 22 may be employed to compensate for dissipation. The proper amount of compensation can be readily provided by the use of a trimmer condenser in parallel with the input condenser of the network, the adjustment of the trimmer condenser being made in conjunction with an oscilloscope adapted to monitor the pulse shape. The amount of dissipation appearing in the network is practically all due to losses in the inductance coils, since condensers can readily be made with very small losses. For practical purposes, however, coils can be made with a sufficiently high Q to keep the losses so low that no special arrangements, such as those just described, are necessary to maintain the desired pulse shape. Indeed, with a network comprising five coils and five condensers, such, for instance as the network described in Fig. 15 and Table II, with the values of Table II being modified as above described for a pulse length of a few microseconds or less and a load impedance of several hundred to a thousand ohms, pulses can readily be obtained which appear entirely rectangular in an oscilloscope, the ripples corresponding to the dotted lines shown in Fig. 3 being of such a small amplitude that they are entirely indistinguishable.

The circuit shown in Fig. 1 is only one of many possible circuits for utilizing the advantageous properties of networks constructed in accordance with the present invention. Even in the particular arrangement shown in Fig. 1 a number of modifications are possible. For instance, instead of the choke 12 a high resistance may be provided, which is sufficiently low to allow the network to charge in the interval between the desired pulses and yet sufficiently high to reduce the anode voltage of the discharge to 14, after the latter has become conducting beyond the value necessary to maintain a glow discharge in spite of a return of the grid voltage to its original biased value. These considerations may require an interval between pulses which is large relative to the pulse duration.

Figure 23:
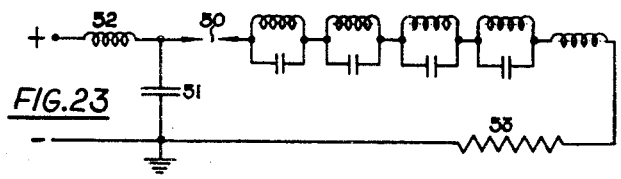
Figs. 23, 24 and 25 are circuit diagrams of alternative arrangements for generating electric pulses in a load by means of a switching operation.

Instead of the gaseous discharge tube 14 a spark type switch might be used, such as a rotary spark gap, a triggered spark gap, or the like. When a rotary spark gap is used, since no bias voltage is necessary, the point B of the circuit may be grounded instead of the point indicated in Fig. 1. If desired, the circuit of Fig. 1 may be modified, where a spark gap switch is used, after the manner shown in Fig. 23, where the spark gap switch 50 is located between the so-called "storage condenser" 51 and the rest of the network (this condenser corresponding to the condenser 7 of Fig. 1). In this arrangement the other side of the condenser 51 is grounded and the charging voltage is applied through the current-limiting choke 52 to the common terminal of the condenser 51 and the spark gap 50. When the spark gap breaks down, the condenser 51 is connected to the rest of the reactive network and discharges in co-operation therewith through the load 53. In such an arrangement it may be advantageous to substitute for the condenser 51 a plurality of condensers connected in a "Marx circuit" for charging in parallel and discharging in series, thereby producing a high voltage, and it may also be advantageous, where recurrent pulses are desired, to charge the condenser 51 or its Marx circuit equivalent by "resonant direct-current charging" or "resonant alternating-current charging," providing the choke 52 with an inductance having the proper relation to the capacitance of the condenser 51 or its Marx circuit equivalent to produce the desired resonant charging. A circuit diagram of a "Marx circuit" with accompanying explanation may be found in well-known texts, such as E. E. Staff M. I. T., Electric Circuits (John Wiley and Sons, Inc., New York, 1945) chap. III, pp. 237–238. In the case of "resonant alternating-current charging," the discharge of the network should be synchronized with the alternations of the charging current, in accordance with known principles, and for this purpose the rotary spark gap may advantageously be operated by a synchronous motor or even from the shaft of the generator which generates the charging current.

Figure 24:
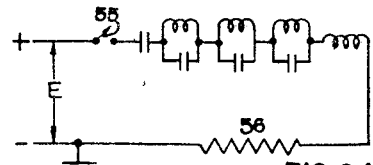

Advantage may be taken of networks constituted in accordance with the present invention not only in circuits such as those described in which the network is suddenly discharged through a load. Fig. 24 shows an arrangement for producing pulses upon the charging of a network. A voltage source is indicated by the symbol E. When the switch 55 is closed the reactive network will charge and, assuming the load to have the proper impedance in accordance with the present invention, a rectangular pulse of current will take place in the load 56, which pulse will come to an end when the network is fully charged. In order that the pulse may be repeated, some way must be provided to discharge the network. An illustrative arrangement for obtaining repeated pulses upon the charging of the network is shown in Fig. 25.

Figure 25:
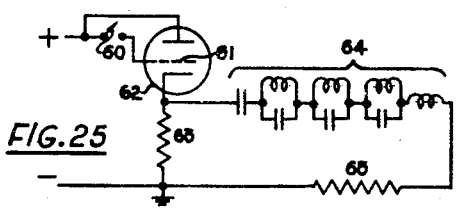

In Fig. 25 the network and the load are coupled to the exciting voltages and switching arrangement by means of a vacuum tube stage of the type known as a cathode follower. The control voltage is applied through the switch 60 upon the grids 61 of the vacuum tube 62. The switch 60 may, if desired, be an electronic device and if desired such device may be adapted to operate at regular intervals. When the control potential is applied by closing the switch 60, the plate current of the vacuum tube 62 will flow through the cathode resistor 63 setting up a voltage which will charge the network 64 in series with the load 65. In this case the sum of the impedances of the cathode resistor 63 and the load 65 should be equal to the impedance into which the network 64 is designed to operate. The cathode resistor 63 is preferably made small relative to the load 65. The pulse formed in the load 65 will terminate when the network 64 becomes fully charged. If thereafter the switch 60 is opened, so that the plate current of the tube 62 ceases to flow, the network will discharge through the resistor 63 and the load 65. If no pulse is desired in the load at this time, a diode might be connected across the load 65 so as to short-circuit the load 65 during the discharge of the network 64 while not substantially interfering with the pulse formed in the load 65 during the charging of the network 64. In the event that the load 65 is a circuit adapted to conduct current only in one direction, such circuit will generally not be affected by voltages in the opposite direction and no additional diode will be necessary unless it is desired for some other purpose, but in order that the network 64 may discharge, it may then be necessary to place in parallel with the load 65 a high resistance or a suitable choke or a combination of these which will permit the discharge of the line and which are of sufficiently high impedance to be practically short-circuited by the load during the charging of the line. With such measures a circuit such as that shown in Fig. 25 may be employed to operate the plate circuit of a transmitting tube or to energize an amplifier or other coupling device which will respond to pulses in one direction but not to oppositely-polarized pulses.

The circuit shown in Fig. 24 bears the same relation to Fig. 4 as the circuit of Fig. 1 bears to Fig. 4a.

The networks heretofore described may be referred to, with regard to their employment in pulse-forming apparatus, as "voltage-fed" networks. Otherwise stated, such networks have a pole at zero frequency and another at infinite frequency. They accordingly do not conduct direct current, and energy is stored therein by charging the condensers with a suitable voltage. Other forms of networks can also be designed in accordance with this invention making use of the above-outlined procedure for arriving at the network constants. Networks of the "current-fed" variety, in which energy is stored by current flowing through the inductances, can also be devised in accordance with the present invention. Not only could such networks be derived from original considerations of transient analysis, as previously outlined in connection with Figs. 4, 5, and 6, but the values for the component of current-fed networks may be derived in a simple manner from the values of voltage-fed networks adapted to produce the desired pulse change. Thus the above-described networks of this invention in which energy storage is electrostatic, simulate, more or less, an open-circuited transmission line; the networks now to be described, in which energy storage is electromagnetic, simulate the reactive characteristic of a transmission line short circuit at the far end.

Figure 26:
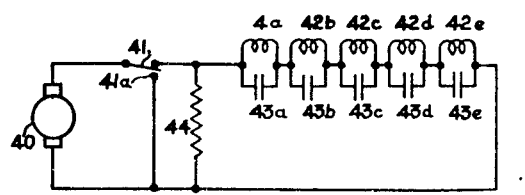
Fig. 26 is a circuit diagram of an apparatus for producing an electric pulse in a load by a sudden change of current flowing in a network.
Figure 27:
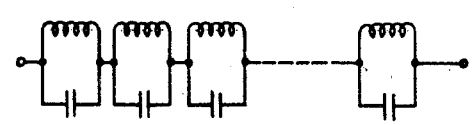
Figs. 27, 28, 29 and 30 are forms of networks adapted to produce rectangular pulses upon a sudden change of current flowing in the network.

Current-fed networks are adapted to conduct a direct current which stores energy in the inductances by setting up a magnetic field. Transient excitation of the network to provide a pulse response may then be established by suddenly interrupting this current. Suddenly turning on the current might also be used to obtain a pulse response. Fig. 26 shows an illustrative circuit employing a current-fed network for the formation of rectangular pulses in response to a switching operation and Figs. 27, 28, 29 and 30 show equivalent forms of networks adapted for use in circuits such as that of Fig. 26.

In the circuit of Fig. 26 current is provided by a generator 40. A switch 41 is located in series with the generator 40. The network includes the inductances 42a, 42b, 42c, 42d and 42e and the condensers 43a, 43b, 43c, 43d, and 43e and is designed for maximum energy transfer to the load 44 by suitable adjustment of the network values as above described. The generator 40 is a current source, rather than a voltage source, so that the switch 41 is provided with two contacts, the second contact, 41a serving to protect the current source by furnishing a path for the current when the network is being discharged.

Figure 28:
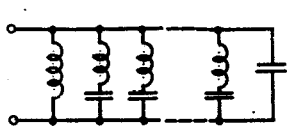
Figure 29:
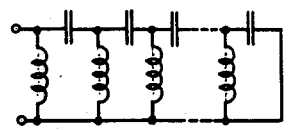
Figure 30:
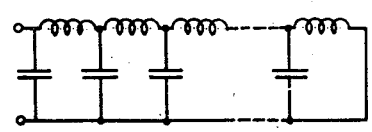

As the circuit is shown in Fig. 26, a pulse will be produced in the load 44 either upon suddenly throwing the switch 41 from either position to the other, the pulse being of one polarity upon throwing the switch in one direction and of the opposite polarity upon throwing the switch in the other direction. If pulses of a single polarity only are desired, a short-circuited diode, suitably polarized, might be connected in parallel with the load 44. If the load 44 is the plate or grid circuit of a vacuum tube, such vacuum-tube circuit can be designed to respond only to pulses of one polarity, as previously mentioned. If it is desired to utilize the pulses formed upon closing the switch 41, it is preferable to provide the inductances 42a, 42b, 42c, 42d, and 42e in the form of very low loss (high Q) coils, so that at the end of the initial pulse the load 44 will be substantially short-circuited by the network. The form of network shown in Fig. 28 is well adapted for use in a circuit such as that of Fig. 26 instead of the network shown in Fig. 26 because it contains a single shunt inductance. If this inductance is constructed so as to produce very low losses, the ordinary methods of construction may be used for the other inductances, since the shunt inductance will provide the desired D. C. short circuit. The circuit of Fig. 26 can be used with a voltage source instead of the constant-current generator 40 if pulses are desired only upon discharge of the network. The lower contact of the switch 41 and its connection would then be eliminated. A diode could be used if it were desired to isolate the load 44 from such transients as might occur while the current in the network was being built up to its steady-state value.

In general, voltage-fed pulse-forming circuits are to be preferred over current-fed circuits such as that in Fig. 26, for the reason that the switching operation for suddenly impressing a voltage is more readily performed where high-power pulses are desired than the switching operation necessary for suddenly interrupting a current. Were it not for the difficulties of switching, the current-fed circuits might be advantageous for high-power pulses because of the elimination of the high voltages necessary for obtaining high-power pulses from a voltage-fed network.

Current-fed networks suitable for formation of pulse-type responses to switching transients which approach a rectangular pulse after the manner shown in Fig. 3, are respectively the "duals" of voltage-fed networks suitable for forming the same type of pulse in response to a switching transient. Thus these current-fed networks may be described by reactance functions which possess zeros where the corresponding reactance function of the voltage-fed network possesses poles and which possesses poles where the said corresponding function possesses zeros. Thus, for instance, the anti-resonant frequencies of the parallel resonant circuits which are connected in series in the network of Fig. 27 (which is the dual of the network of Fig. 6) will be the same frequencies as the resonant frequencies of the series resonant circuits which are connected in parallel in the network of Fig. 6. The relationship of duality exists not only between the networks of Figs. 6 and 27, but also between the network of Fig. 15 and that of Fig. 28 between the network of Fig. 16 and that of Fig. 30 and between the network of Fig. 17 and that of Fig. 29. Accordingly, in accordance with the well-known principle of duality, for the same pulse length and a one-ohm load impedance, the magnitudes of the capacitances of one of these networks, expressed in farads, is equal to the respective magnitudes of the inductances of the corresponding dual network, expressed in henries, and vice versa. By means of this relation values of the components of networks in the form of Figs. 27, 28, 29 and 30 for the formation of rectangular pulses in accordance with the present invention may be readily determined from the information presented in Tables I, II, III and IV relating to the respective dual networks. As a consequence of the relationship of duality above explained, variation of the magnitude of the shunt inductance across the input terminals in the networks of Fig. 28 and Fig. 29 may be employed to control the shape of the pulse in the same manner as was described in connection with Fig. 22 for the variation of the series capacitances $C_0'$ of Fig. 15 and $C_1'''$ of Fig. 17. Likewise the increase of current in the said shunt inductances of Figs 28 and 29 will be linear during the pulse interval just as the rise of voltage across the said series capacitances of Figs. 15 and 17 is linear during the pulse interval, as was shown in the case of a network of the form of Fig. 15 in the explanation of Figs. 10–14.

The advantages and distinguishing characteristics of networks according to the present invention may be further illustrated by a brief consideration of a network not according to the present invention which in the absence of a better arrangement might be used in a circuit such as that shown generally in Fig. 1 instead of the network there shown, between the points A and B.

Consider for example a network having an arrangement of components such as that shown in Fig. 16, the magnitude of said components, instead of being derived in accordance with the present invention, being given in the following table:

Table VI

| $L_1''$ | $L_2''$ | $L_3''$ | $L_4''$ | $L_5''$ |
|---|---|---|---|---|
| .05556 | .1111 | .1111 | .1111 | .1111 |
| $C_1''$ | $C_2''$ | $C_3''$ | $C_4''$ | $C_5''$ |
| .1111 | .1111 | .1111 | .1111 | .05556 |

Such a network will be recognized as a network of a series of cascaded $\pi$ sections fed through a suitable half-section. The arrangement might also be regarded as a cascade of similar T sections terminated at the "far" end by a suitable half-section. This is the well-known approximation of a transmission line by means of a number of similar constant-$k$ filter sections in cascade. The values given in Table VI have been chosen for working into the same load impedance as the values given in Table III, so that direct comparison of the magnitudes given in Table II and in Table VI may be made for further illustration of the difference between networks according to the present invention and conventional "artificial lines."

The behavior of the network given in Table VI is best illustrated by describing the reactance characteristic of the network, or at least locating the zeros and poles of this reactance function. The zeros and poles of the reactance function of the network may be obtained in the manner illustrated in Fig. 31.

The network here in question, described by Fig. 16 and Table VI, may be regarded as a low-pass filter and it will have a cut-off frequency $f_c$, which for the 10-component network described in Table VI, with magnitudes adjusted for a pulse length of one microsecond and a network impedance of 1000 ohms, is equal to 2.86 megacycles per second. It is known that the phase characteristic of such a filter in the transmission range may be represented by an inverse sine curve. The resonant and anti-resonant frequencies of the network may then be obtained from the phase characteristic curve as follows.

Figure 31:
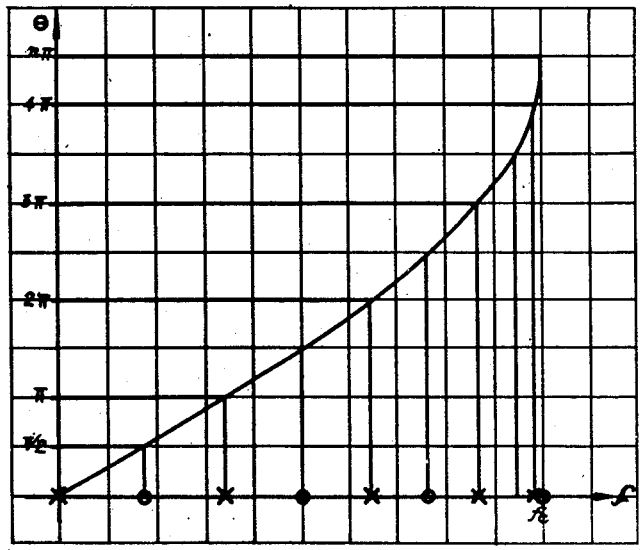
Fig. 31 is a diagram showing the characteristics of a pulse-forming network constituted according to a method formerly employed.

Fig. 31 shows the phase characteristic of the network of Table VI, the phase shift angle in radians being plotted against frequency. The curve in Fig. 31 rises from the origin in the shape of one quadrant of an inverse sine curve, as shown, reaching the cut-off frequency at the point where its slope is 90°. The value of the phase shift at the cut-off frequency is $n\pi$, where $n$ is equal to the number of cascaded constant-$k$ sections in the filter. In the ten-component filter of Table VII there are 4½ constant-$k$ sections, so that $n$ is equal to 4.5. The resonant frequencies will be the frequencies for which the phase shift is an odd multiple of $$\frac{\pi}{2}$$

and the anti-resonant frequencies will be those for which the phase shift is an even multiple of $$\frac{\pi}{2}$$

so that if the axis of ordinates is divided, between the values of zero and $n\pi$, into $2n$ division, the intercepts of the dividing points on the inverse sine phase characteristic will give the resonant and anti-resonant frequencies. These intercepts are shown on Fig. 31 and the position of the zeros and poles of the reactance function are shown respectively by circles and crosses on the frequency axis after the manner of Fig. 7. Since the part of the inverse sine curve nearer the origin is almost linear, the lower-frequency zeros and poles will be almost evenly spaced. Thus for lower frequencies the reactance function of the network is similar to that of a transmission line. As higher frequencies are approached, however, both the poles and the zeros become more closely spaced after the manner of a single progression, thus departing substantially from the arrangement of poles and zeros in the reactance function of a transmission line in the neighborhood of any finite frequency. Since the number of resonant and anti-resonant frequencies is more concentrated in the higher-frequencies than in the lower-frequency region, a relatively substantial number of these resonant and anti-resonant frequencies lie in the range where the reactance function of the network does not resemble that of a transmission line and may be regarded as "wasted." Thus in the 10-component network previously mentioned as having a "cut-off frequency" of 2.86 mc./sec., the zeros appear at 0.492, 1.43, 2.19, 2.69 and 2.86 mc./sec., and the "internal" poles appear at 0.98, 1.84, 2.48 and 2.82 mc./sec. Only two of the five zeros lie in positions adapted to contribute substantially to the desired form of response. In a corresponding 10-component network according to the present invention, the zeros will appear at 0.5, 1.5, 2.5, 3.5 and 4.5 mc./sec., with "internal" poles appearing at 1.1, 2.2, 3.3 and 4.4 mc./sec.

In order to increase the range of frequency in which the resonant and anti-resonant frequencies are spaced in the form of a linear progression, it is necessary in this type of network to increase the number of sections and hence the number of components (at the same time raising the cut-off frequency, if the pulse length is kept constant). Moreover, when the number of sections is thus increased, a considerable proportion of the new resonant frequencies added occur in the non-useful high-frequency range. Finally, the type of approximation to a transmission line which is obtained by a filter such as that described in Fig. 7 is that which gives a response in the form of a Fourier approximation to the response of the transmission line. In other words the characteristic of the filter does not differ substantially from that of the transmission line in the lower range of frequencies and as higher frequencies are approached it differs more and more. In contrast, the reactance characteristic of networks according to the present invention do involve substantial differences from the characteristic of a transmission line in the lower-frequency range and, moreover, in the higher-frequency range, instead of poles and zeros at places other than the poles and zeros which a transmission line would have, networks in accordance with the present invention generally have no zeros and no poles except the pole at infinity (referring particularly to the voltage-fed type of network, it being understood that in the current-fed type of network the poles and zeros mutually replaced by zeros and poles of the voltage-fed type of network). The difference in result between the two types of networks has already been fully explained in connection with Figs. 2 and 3.

Referring again to Fig. 7, it will be noted that in voltage-fed networks in accordance with the present invention, no zeros appear in a non-useful position—each one appears at a point adapted to define a useful contribution to the desired response, so that in a sense a maximum effectiveness is obtained from a given number of reactive components. The location of the poles between the zeros, however, departs definitely, and in a systematic way, from the location of poles in the corresponding frequency characteristic of a transmission line. The poles beginning with the first pole at the origin and zeros beginning at the first zero at the frequency $$\frac{1}{2\delta}$$

form respectively two separate progressions with uniform spacing within each progression. In the arrangement of poles and zeros shown in Fig. 24, however, the poles and zeros form a single progression with gradually decreasing distance between the elements thereof (i. e., those between successive poles and between successive zeros).

In the case of current-fed networks in accordance with the present invention, as previously explained, the poles of the reactance function had locations corresponding to the location of the zeros in the reactance function of the voltage-fed network of which it is the dual. In the current-fed network according to the present invention it is the anti-resonant frequencies which are important and which are to be located at the odd harmonics of the frequency $$\frac{1}{2\delta}$$

while the resonant frequencies are displaced from the even harmonics of said frequencies in the same manner as the anti-resonant frequencies of the corresponding voltage-fed network also displaced. Thus it may be said that in a current-fed network for the formation of a rectangular pulse in accordance with the present invention none of the anti-resonant frequencies are located in a non-useful position.

The utility of the present invention is not limited to the production of rectangular pulses of electricity. Thus it will be recalled that it was pointed out in connection with Fig. 11 that when a rectangular pulse was formed in the resistance 72 of Fig. 10, a linear rise of voltage takes place across the condenser 74. A similar linear voltage change takes place across the condenser 7 of Fig. 1 when a rectangular pulse is produced in the load 1. In the case of Fig. 1 the linear change of voltage is a fall of voltage. The circuit of Fig. 10 corresponds in substance to the circuit of Fig. 24 and Fig. 25. A network of the type shown in Fig. 17 might also be employed for the purpose of obtaining a linear voltage change across the condenser $C_1'''$. Such linear voltage transient, when suitably amplified, may be employed to provide a fast linear sweep voltage for the deflecting circuit of a cathode-ray tube, or for other purposes. A similar application of the linear current rise during the pulse interval in the shunt inductance of Figs. 28 and 29 might be made, although it is probably more convenient to make use of the voltage rise across a series condenser in a voltage-fed network, on account of the importance of not abstracting an appreciable amount of power in this way in order to preserve the linearity of the transient.

What I desire to claim and obtain by Letters Patent is:

1. A reactive network having substantially the characteristics of a lossless uniform transmission line, including $n$ inductances and $n$ capacitances of such magnitudes that said network has one set of $n$ critical frequencies having substantially the relative proportions $1:3:5: \ldots (2n-1)$ and another set of $(n+1)$ critical frequencies, including zero and infinite frequency, of which the finite non-zero critical frequencies have substantially the relative proportion $1:2:3: \ldots (n-1)$, the ratio of the lowest of said last-mentioned frequencies to the arithmetic mean of the two lowest of said first-mentioned set of critical frequencies being approximately proportional to $$\frac{2n}{2n-1}$$

$n$ being an integral number greater than 1.

2. A reactive network having substantially the characteristics of a lossless open-circuited uniform transmission line, said network having $n$ inductances and $n$ capacitances of such magnitudes that said network has $n$ resonant frequencies having substantially the relative proportions $1:3:5: \ldots (2n-1)$, is substantially nonconducting at zero frequency (direct current), and has $(n-1)$ finite non-zero anti-resonant frequencies having substantially the relative proportions $1:2:3: \ldots (n-1)$, each of said $(n-1)$ anti-resonant frequencies being greater than the arithmetic mean of the nearest resonant frequencies by a proportion of approximately $$\frac{2n}{2n-1}$$

$n$ being an integral number greater than 1, said inductances and capacitances being arranged in circuit so that the reactance function of said network has a pole at infinity.

3. A reactive network having substantially the characteristics of a lossless short-circuited uniform transmission line, said network having $n$ inductances and $n$ capacitances of such magnitudes that said network has $n$ anti-resonant frequencies having substantially the relative proportions $1:3:5: \ldots (2n-1)$, is conducting at zero frequency, approaches zero reactance towards infinitely large frequencies and has $(n-1)$ finite non-zero resonant frequencies having substantially the relative proportions $1:2:3: \ldots (n-1)$, each of said $(n-1)$ resonant frequencies being greater than the mean of the two nearest anti-resonant frequencies by a proportion of approximately $$\frac{2n}{2n-1}$$

$n$ being an integral number greater than 1.

4. A reactive network having substantially the characteristics of a lossless uniform transmission line, said network having $n$ inductances and $n$ capacitances of such magnitudes that said network has a set of critical frequencies including zero and infinite frequency, the finite non-zero members of which set are approximately equal to $$\frac{2nm}{2n-1}\cdot\frac{c}{2s}$$

cycles per second in which $n$ is an integer greater than one, $m=1, 2, 3 \ldots (n-1)$, $c$ is the velocity of light and $s$ is the length of the transmission the behavior of which the network is adapted to simulate.

5. A reactive network having substantially the characteristics of a lossless open-circuited transmission line of length $s$, said network having $n$ inductances and $n$ capacitances arranged so that said network is non-conducting at zero frequency and so that the reactance function of said network has $(n-1)$ finite non-zero anti-resonant frequencies approximately equal to $$\frac{2nm}{2n-1} \cdot \frac{2c}{s}$$

cycles per second, where $m=1, 2, 3 \ldots (n-1)$ and $c$ is the velocity of light, $n$ being an integer greater than 1.

6. A reactive network having substantially the reactive characteristics of a uniform transmission line, said network having inductances and capacitances such that the finite critical frequencies of said network form substantially a double arithmetic progression each branch progression of which includes a set of alternate critical frequencies, said branches having an equal number of finite terms.

7. A reactive network having substantially the characteristics of an open-circuited transmission line, said network having inductances and capacitances such that the reactance function corresponding thereto has zeros at values of frequency forming substantially an arithmetic progression beginning at a finite non-zero value and has poles at finite values of frequency forming substantially an arithmetic progression beginning at zero.

8. A reactive network having substantially the characteristics of a short-circuited transmission line, said network having inductances and capacitances such that the reactance function corresponding thereto has poles at values of frequency forming substantially an arithmetic progression beginning at a finite non-zero value and has zeros at finite values of frequency forming substantially an arithmetic progression beginning at zero.

9. A reactive network having substantially the reactive characteristics of a uniform transmission line, said network having inductances and capacitances such that the finite critical frequencies of said network form substantially a double arithmetic progression each branch progression of which includes a set of alternate critical frequencies, said branches having an equal number of terms, said inductances and capacitances being further arranged so that a single reactive component among them is adapted to store substantially all the electrical energy stored in said network when said network is in a steady-state excited condition.

10. A reactive network having substantially the characteristics of an open-circuited transmission line, said network having inductances and capacitances such that the reactance function corresponding thereto has zeros at values of frequency forming substantially arithmetic progression beginning at a finite non-zero value and has poles at finite values of frequencies forming a substantially arithmetic progression beginning at zero, said inductances and capacitances being further so connected electrically that a single capacitance is adapted to store substantially all the electrostatic energy stored in said network when said network is in a steady-state charged condition.

11. A reactive network having substantially characteristics of a short-circuited transmission line, said network having inductances and capacitances such that the reactance function corresponding thereto has poles at values of frequency forming substantially an arithmetic progression beginning at a finite non-zero value and has zeros at finite values of frequency forming substantially an arithmetic progression beginning at zero, said inductances and capacitances being, further, electrically connected so that a single inductance is adapted to store substantially all the electromagnetic energy stored in said network when said network is in a steady-state excited condition.

12. In combination with a source of electric energy, a switching device and a load, in a circuit for producing substantially rectangular pulses of electricity, a reactive network having inductances and capacitances such that the finite critical frequencies of said network form substantially a double arithmetic progression, each branch progression of which includes a set of alternate critical frequencies, said branches having an equal number of terms, the relative magnitude of said inductances and capacitances being determined by the said critical frequencies, and the absolute magnitude of said inductances and capacitances being such that said network exhibits a characteristic impedance substantially equal to the effective impedance of said load when subjected to pulses of electricity.

13. A circuit for producing substantially rectangular pulses of electric energy in a load forming part of said circuit, said circuit including, in addition to said load, a source of electric energy, a switching device, and a reactive network having reactive components such that the finite critical frequencies of said network form substantially a double arithmetic progression each branch progression of which includes a set of alternate critical frequencies, said branches having an equal number of terms, the said reactive components in said network being so connected that one of said components is adapted to store substantially all the electric energy stored in said network when said network is in a steady-state excited condition, the absolute magnitude of said reactive components being such that the said network exhibits a characteristic impedance of approximately the same magnitude as the effective impedance of said load when said load is energized.

14. A circuit for producing substantially rectangular pulses of electric energy in a load forming part of said circuit including, in addition to said load, a source of electric energy, a switching device, and a reactive network having inductances and capacitances such that the reactance function corresponding thereto has zeros at values of frequency forming substantially an arithmetic progression beginning at a finite non-zero value, and has poles at finite values of frequency forming substantially an arithmetic progression beginning at zero, the said reactive components in said network being so connected that a series capacitance is provided adapted to store substantially all the electrostatic energy stored in said network when said network is in a steady-state charged condition, the absolute magnitude of said reactive component being such that the said network exhibits a characteristic impedance of approximately the same magnitude as the effective impedance of said load when said load is energized.

15. A circuit for producing substantially rectangular pulses of electric energy in a load forming part of said circuit, said circuit including, in addition to said load, a source of electric energy, a switching device, and a reactive network having reactive components such that the reactance function corresponding thereto has poles at values of frequency forming substantially an arithmetic progression beginning at a finite non-zero value and has zeros at finite values of frequency forming substantially an arithmetic progression beginning at zero, the said reactive components in said network being so connected that a shunt inductance is provided adapted to store substantially all the electric energy stored in said network when said network is in a steady-state excited condition, the absolute magnitude of said reactive components being such that the said network exhibits a characteristic impedance of approximately the same magnitude as the effective impedance of said load when said load is energized.

16. A circuit for producing, at a relatively steady recurrence rate, substantially rectangular pulses of electric energy in a load forming part of said circuit, said circuit including, in addition to said load, a source of electric energy provided with a reactive element associated in circuit with said source, a switching device, and a reactive network having reactive components such that the finite critical frequencies of said network form substantially a double arithmetic progression, each branch progression of which includes a set of alternate critical frequencies, said branches having an equal number of terms, the absolute magnitude of said reactive components being such that the said network exhibits a characteristic impedance of approximately the same magnitude as the effective impedance of said load when said load is energized, said reactive element associated with said source of electric energy being approximately of a magnitude adapted to resonate at said recurrence rate with the steady-state energy storage reactance of said network, whereby the amount of electrical energy intermittently stored in said network is increased.

17. A circuit for producing, at a relative steady-recurrence rate, substantially rectangular pulses of electric energy in a load forming part of said circuit, said circuit including, in addition to said load, a source of electric energy and associated therewith a series inductance, a switching device, and a reactive network having reactive components such that the reactant function corresponding thereto has zeros at values of frequency forming substantially an arithmetic progression beginning at a finite non-zero value and has poles at finite values of frequency forming substantially an arithmetic progression beginning at zero, the absolute magnitude of said reactive components being such that said network exhibits a characteristic impedance of approximately the same magnitude as the effective impedance of said load when said load is energized, the said series inductance associated with said source of electric energy being approximately of such magnitude as to resonate with the storage capacitance of said network at said recurrence rate.

18. A circuit for producing, at a relatively steady recurrence rate, substantially rectangular pulses of electric energy in a load forming part of said circuit, said circuit including, in addition to said load, a source of electric energy including in association therewith a shunt capacitance, a switching device, and a reactive network having reactive components such that the reactance function corresponding thereto has poles at values of frequency forming substantially an arithmetic progression beginning at a finite non-zero value and has zeros at finite values of frequency forming substantially an arithmetic progression beginning at zero, the absolute magnitude of said reactive components being such that the said network exhibits a characteristic impedance of approximately the same magnitude as the effective impedance of said load when said load is energized, said shunt capacitances associated with said source of electric energy being approximately of a magnitude adapted to resonate at said recurrence rate with the effective storage inductance of said network.

19. A circuit for producing, at a relatively steady recurrence rate, substantially rectangular pulses of electric energy in a load forming part of said circuit, said circuit including, in addition to said load, a source of electric energy and associated therewith a series inductance, a switching device, and a reactive network having reactive components such that the reactance function corresponding thereto has zeros at values of frequency forming substantially an arithmetic progression beginning at a finite non-zero value, and has poles at finite values of frequency forming substantially an arithmetic progression beginning at zero, said reactive components in said network being so connected that a single capacitance therein is adapted to store substantially all the electric energy stored in said network when said network is in a steady-state charged condition, said inductance associated with said source of electric energy being approximately of a magnitude adapted to resonate at said recurrence rate with said single storage condenser of said network.

20. A circuit for producing pulses of electricity having an abrupt beginning and ending including a direct current source of electrical energy, a switching device, a load in which it is desired to produce said pulses, a reactive network derived from another network adapted to substantially simulate the reactance characteristics of an open-circuited uniform transmission line and having reactive components connected so that a single condenser is adapted to store substantially all the energy stored in said last-mentioned network when said network is in a steady-state charged condition, said first-mentioned network being derived from said other network solely by reducing the magnitude of the capacitance of said single condenser from the value it had in said other network.

21. A circuit for producing abrupt pulses of electrical energy including a source of direct current electrical energy, a switching device, a load, and a reactive network, said network having an input series condenser and being derived from another network having also an input series condenser by reducing the magnitude of the capacitance of said condenser from its value in said other circuit, said other network having substantially the reactance characteristics of an open-circuited uniform transmission line.

ERNST A. GUILLEMIN.

REFERENCES CITED

The following references are of record in the file of this patent:

UNITED STATES PATENTS

| Number | Name | Date |
|---|---|---|
| 2,145,332 | Bedford | Jan. 31, 1939 |
| 2,149,077 | Vance | Feb. 28, 1939 |
| 2,405,069 | Tonks | July 30, 1946 |